(12) United States Patent
Park et al.

(10) Patent No.: US 7,536,703 B2
(45) Date of Patent: May 19, 2009

(54) DISC CARTRIDGE ASSEMBLY

(75) Inventors: Kyung Chan Park, Seoul (KR); Hyung Jun Lim, Seoul (KR); In Seop Eom, Gyeonggi-do (KR); Ji Duk Kim, Seoul (KR); Jin Yong Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 10/974,790

(22) Filed: Oct. 28, 2004

(65) Prior Publication Data

US 2005/0091678 A1    Apr. 28, 2005

(30) Foreign Application Priority Data

| Oct. 28, 2003 | (KR) | 10-2003-0075391 |
| Nov. 18, 2003 | (KR) | 10-2003-0081482 |
| Dec. 11, 2003 | (KR) | 10-2003-0090241 |

(51) Int. Cl.
G11B 23/03 (2006.01)

(52) U.S. Cl. .......... 720/742; 720/739; 720/740

(58) Field of Classification Search .......... 720/734, 720/732, 735, 737, 738, 739, 740, 742, 718
See application file for complete search history.

(56) References Cited

U.S. PATENT DOCUMENTS

| 5,268,808 | A | 12/1993 | Childers | |
| 6,044,058 | A | 3/2000 | Miyazaki et al. | 720/720 |
| 6,078,562 | A | 6/2000 | Kikuchi et al. | 720/734 |
| 6,269,074 | B1 | 7/2001 | Funawatari et al. | 720/735 |
| 7,340,753 | B2 * | 3/2008 | Inata et al. | 720/643 |
| 2002/0012316 | A1 * | 1/2002 | Inoue et al. | 369/291 |
| 2003/0156533 | A1 | 8/2003 | Yim et al. | 720/739 |
| 2003/0179696 | A1 | 9/2003 | Eum et al. | |
| 2003/0235144 | A1 | 12/2003 | Eum et al. | 720/742 |
| 2004/0052204 | A1 * | 3/2004 | Okazawa et al. | 369/291 |
| 2005/0060737 | A1 * | 3/2005 | Kang et al. | 720/739 |

FOREIGN PATENT DOCUMENTS

| CN | 1239572 A | | 12/1999 |
| EP | 0602731 A2 | * | 6/1994 |
| EP | 0772196 A2 | * | 7/1997 |
| EP | 0 929 070 A2 | | 7/1999 |
| JP | 10-144039 | * | 5/1998 |
| JP | 10-269742 | * | 10/1998 |

(Continued)

*Primary Examiner*—Julie Anne Watko
(74) *Attorney, Agent, or Firm*—Birch, Stewart, Kolasch & Birch, LLP

(57) ABSTRACT

The present invention provides a disc cartridge assembly, by which loading/unloading of a disc is facilitated to enable both one use in a cartridge state and the other a use as a single disc entity. The present invention includes a lower case having a window for a drive access, an upper case provided onto the lower case, the upper case having an exposure window provided to a central part to expose a label face of a disc, a rotating ring rotatably provided within the upper and lower cases to receive an outer circumference of the disc, at least one shutter provided within the upper and lower cases to open/close the window by interoperating with a rotation of the rotating ring, and a rotating means for rotating the rotating ring by interoperating with an external device.

20 Claims, 30 Drawing Sheets

FOREIGN PATENT DOCUMENTS

| JP | 2000-113630 A | 4/2000 |
| JP | 2001-189068 | * 10/2001 |
| JP | 2001-332058 A | 11/2001 |
| JP | 2002-025215 | * 1/2002 |
| JP | 2003-115182 A | 4/2003 |

* cited by examiner

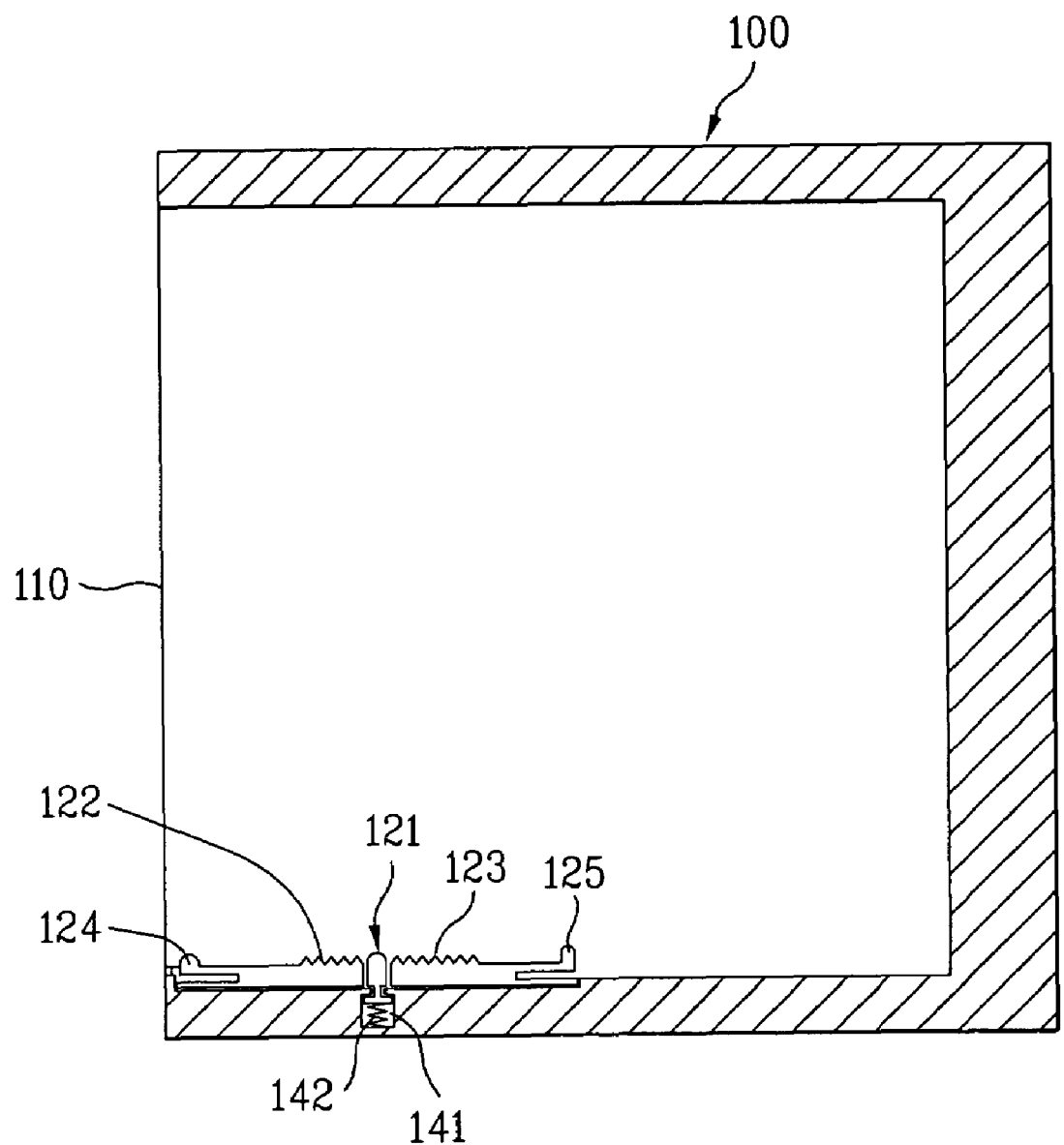

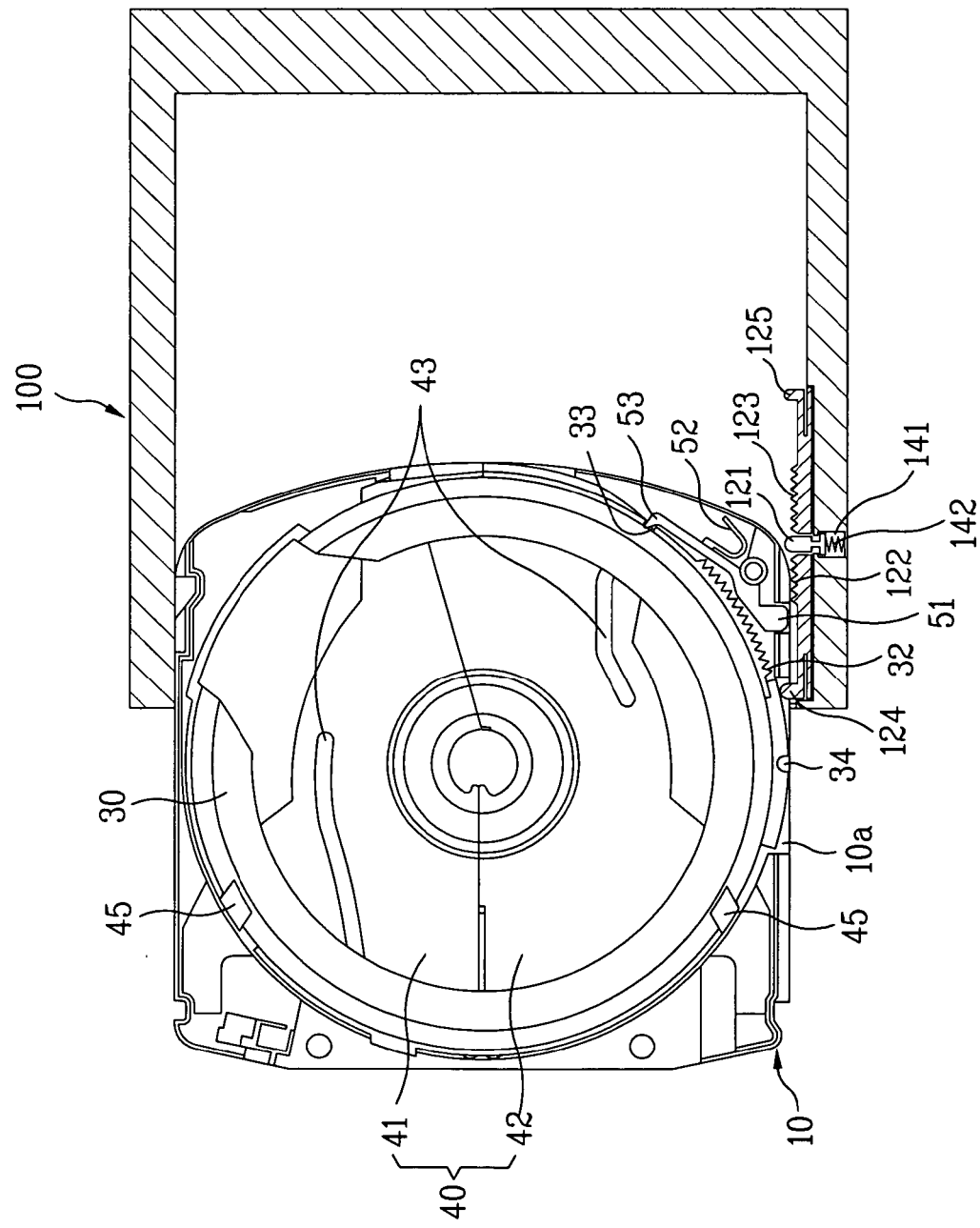

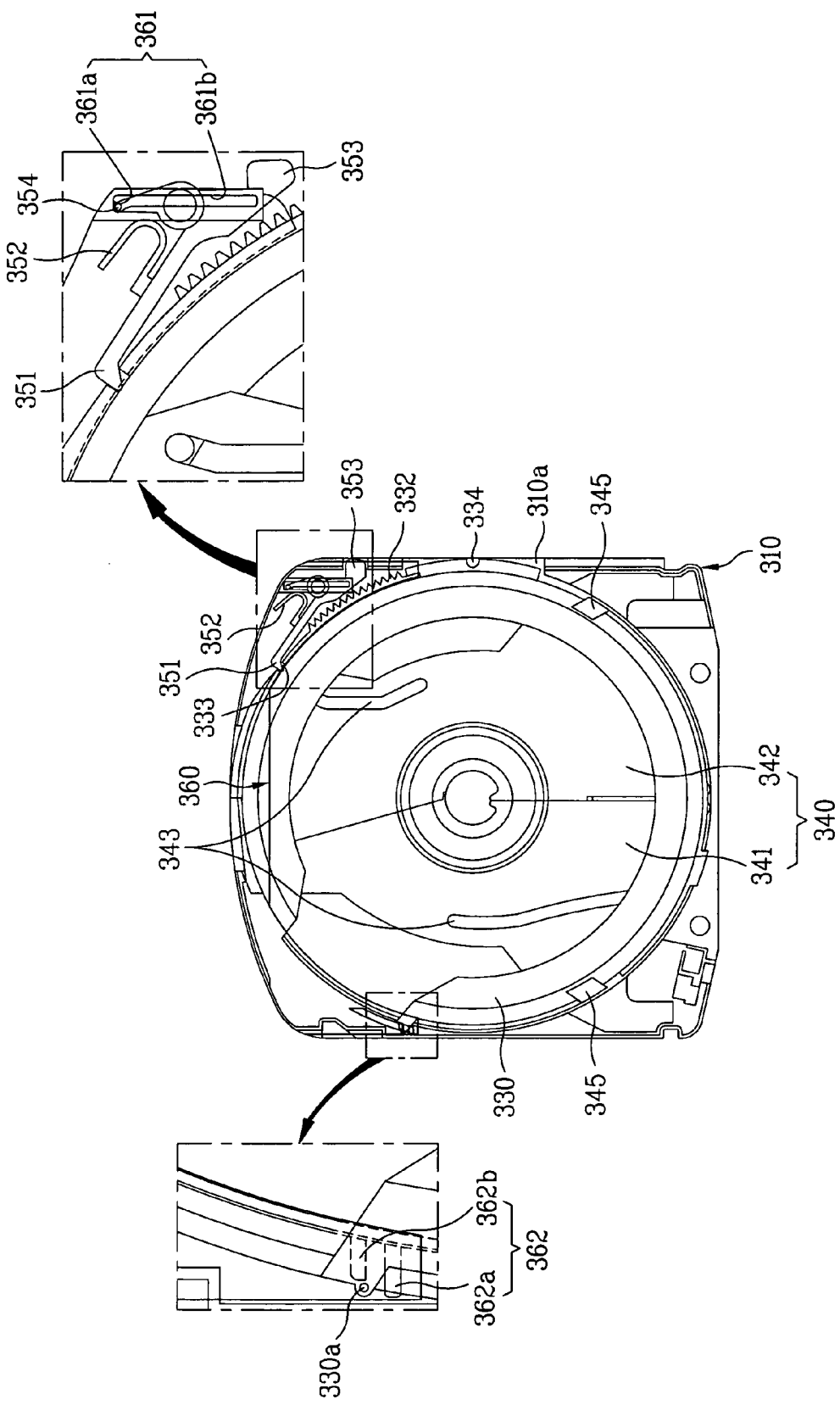

DISC CARTRIDGE ASSEMBLY

This application claims the benefit of the Korean Application No. 10-2003-0075391 filed on Oct. 28, 2003, 10-2003-0081482 filed on Nov. 18, 2003, and 10-2003-0090241 filed on Dec. 11, 2003 which are hereby incorporated by reference.

BACKGROUND OF THE INVENTION

1. Field of the Invention

The present invention relates to a disc cartridge, and more particularly, to a disc cartridge assembly, by which loading/unloading of a disc is facilitated to enable both one use in a cartridge state and the other a use as a single disc entity.

2. Discussion of the Related Art

Generally, an optical disc, on which information is recorded using a laser beam, is a storage medium of large capacity to read voice or video information converted to digital codes in a manner of applying a weak laser beam to a surface of the disc to recognize strength or weakness of a reflective laser beam.

There are CD (compact disc), DVD, LD, and the like as optical disc media. Recently, the Blue-ray disc (BD) group and the AOD (advanced optical disc) group are competing with each other for the next generation optical disc storage media standards.

The Blue-ray disc, which has been developed to aim at HDVDR (high-definition video disc recorder), is the next generation optical disc storage medium using a blue semiconductor laser beam enabling to record data more than the previous red laser beam does. Hence, the Blue-ray disc makes it possible to record over 2 hours of HDTV, or more than 13 hours of SDTV on a 27 GB disc.

Attention is highly paid to the Blue-ray disc as a new storage medium compensating disadvantages of the previous DVD.

Meanwhile, a disc type record medium is inserted in a separate case to protect a recording surface safely against dust, scratch, and the like while being normally kept or transported.

Currently, the record density is being raised and a thickness of a protective layer gets thinner. Hence, a cartridge having a disc inserted therein is used as it is, whereby the recording surface can be continuously protected in the course of storing data in the disc type record medium or moving to load a disc in a player.

In general, a storage/playback device of a disc type record medium employs a method enabling to use both a single entity of disc or a cartridge having a disc assembled thereto.

For instance, a portable storage/playback device prefers a single disc entity loading to a disc-loaded cartridge loading because of spatial limitation.

Eventually, in case of intending to use a disc loaded in a cartridge for a portable disc record medium storage/playback device enabling a single disc entity loading only, the disc needs to be separated from the cartridge.

Yet, it is able to use a previous Blue-ray disc cartridge, as shown in FIG. 1 and FIG. 2, only if a disc D is loaded within the cartridge.

Namely, while the disc D is received within the cartridge, a lower case 1 and upper case 3 are assembled to each other by screws S. In case of unloading the disc D from the cartridge, the screws S should be unscrewed.

Besides, if the screws S are unscrewed, it is highly probable that various parts, as shown in FIG. 3, could be disassembled.

Installed within the cartridge are a shutter 6 opening/closing a window W for a drive access, a rotating wheel 7 for opening/closing the shutter, a shutter latch (not shown in the drawing) keeping the shutter 6 closed, and the like, which are not fixed to the cartridge. Hence, in case of unscrewing the screws S, the parts could be disassembled from each other.

Hence, it becomes a major concern that a disc cartridge is developed to facilitate loading/unloading of the disc D in/from the cartridge to enable both a usage of a cartridge state and a usage of a single disc entity.

SUMMARY OF THE INVENTION

Accordingly, the present invention is directed to a disc cartridge assembly that substantially obviates one or more problems due to limitations and disadvantages of the related art.

An object of the present invention is to provide a disc cartridge assembly, by which loading/unloading of a disc is facilitated to enable both one use in a cartridge state and the other a use as a single disc entity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a disc cartridge assembly according to the present invention includes a lower case having a window for a drive access, an upper case provided onto the lower case, the upper case having an exposure window provided to a central part to expose a label face of a disc, a rotating ring rotatably provided within the upper and lower cases to receive an outer circumference of the disc, at least one shutter provided within the upper and lower cases to open/close the window by interoperating with a rotation of the rotating ring, and a rotating means for rotating the rotating ring by interoperating with an external device.

In another aspect of the present invention, a disc cartridge assembly includes a lower case having a window for a drive access, an upper case provided onto the lower case, the upper case having an exposure window provided to a central part to expose a label face of a disc, a rotating ring rotatably provided within the upper and lower cases to receive an outer circumference of the disc, a shutter provided within the upper and lower cases to open/close the window by interoperating with a rotation of the rotating ring, a holding protrusion provided to the shutter to selectively hold an edge of the disc according to a movement of the shutter, and a rotating means for rotating the rotating ring.

In another aspect of the present invention, a disc cartridge assembly includes a lower case having a window for a drive access, an upper case provided onto the lower case, the upper case having an exposure window provided to a central part to expose a label face of a disc, a rotating ring rotatably provided within the upper and lower cases to receive an outer circumference of the disc, left and right shutters provided within the upper and lower cases to open/close the window by interoperating with a rotation of the rotating ring, holding protrusions provided to the left and right shutters to selectively hold an edge of the disc according to movements of the left and right shutters, respectively, and a manual opening/closing module provided to one sides of the upper and lower cases to be selectively rotated centering on a center of the disc, the manual opening/closing module interfering with an outer circumference of the rotating ring to rotate the rotating ring.

In a further aspect of the present invention, a disc cartridge assembly includes a lower case having a window for a drive access, an upper case provided onto the lower case, the upper case having an exposure window provided to a central part to expose a label face of a disc, a rotating ring rotatably provided within the upper and lower cases to receive an outer circumference of the disc, left and right shutters provided within the upper and lower cases to open/close the window by interoperating with a rotation of the rotating ring, holding protrusions provided to the left and right shutters to selectively hold an edge of the disc according to movements of the left and right shutters, respectively, a locking lever rotatably provided to the lower case, the locking lever rotated to selectively lock the rotation of the rotating ring, and a movable case provided movable to slide along one side of the upper case, the movable case interoperating with the locking lever to selectively release a locking state of the rotating ring, the movable case rotating the rotating ring by interoperating with the rotating ring.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a cross-sectional diagram of the disc separating apparatus in FIG. 6;

FIGS. 8A to 8D are diagrams of an interoperating structure between the disc separating apparatus in FIG. 6 and the disc cartridge in FIG. 4;

FIGS. 15A, 15A-1, 15B and 15B-1 are perspective and cross-sectional diagrams of an elastic button and movement-preventing protrusion assembled to each other, respectively;

FIGS. 16A, 16A-1, 16B and 16B-1 are perspective and cross-sectional diagrams of an elastic button and locking lever assembled to each other, respectively;

FIGS. 20A to 20C are layouts of a process of separating a disc by sliding a movable case.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A disc cartridge assembly according to the present invention is explained in detail with reference to FIGS. 4 to 21C as follows.

First of all, a disc cartridge assembly according to one embodiment of the present invention is explained with reference to FIGS. 4 to 12 as follows.

Figure 4:
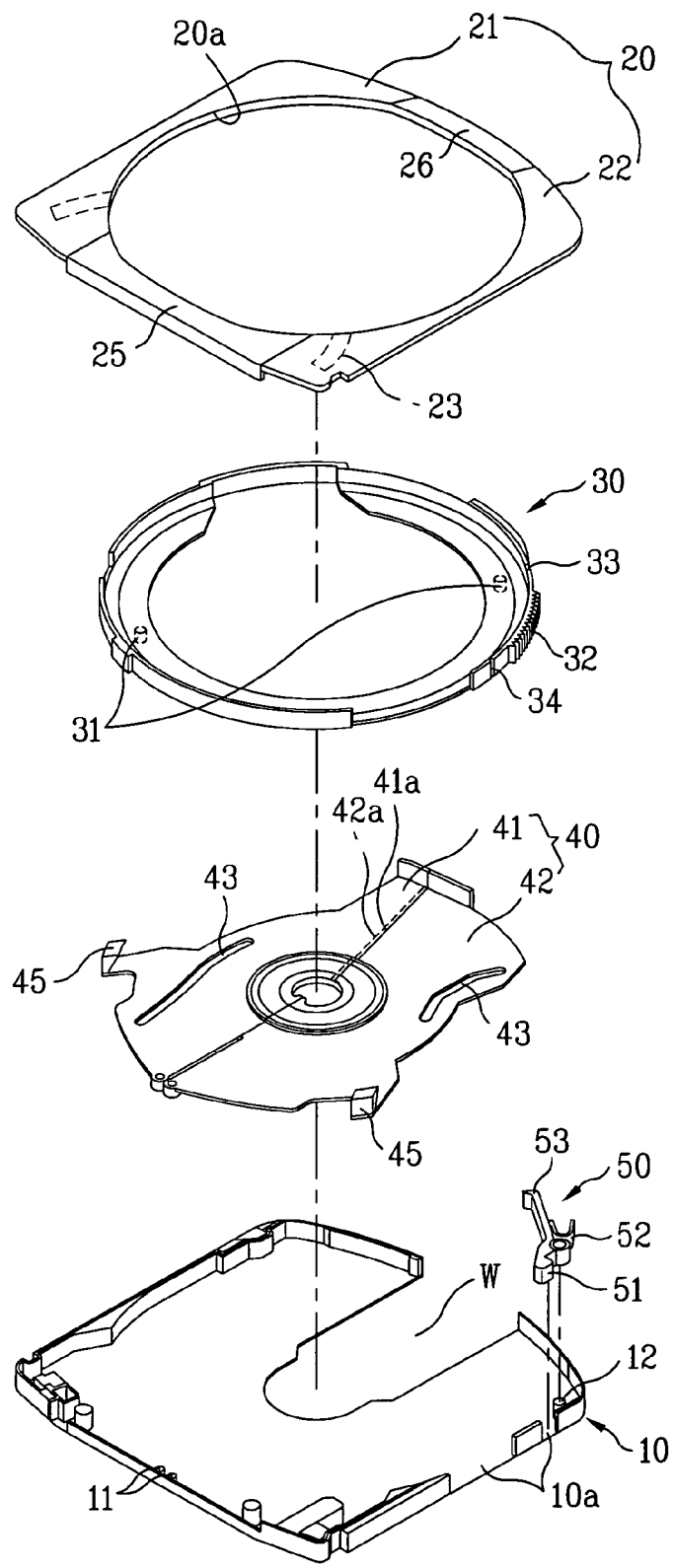
FIG. 4 is a projected perspective diagram of a disc cartridge assembly according to one embodiment of the present invention.
Figure 5:
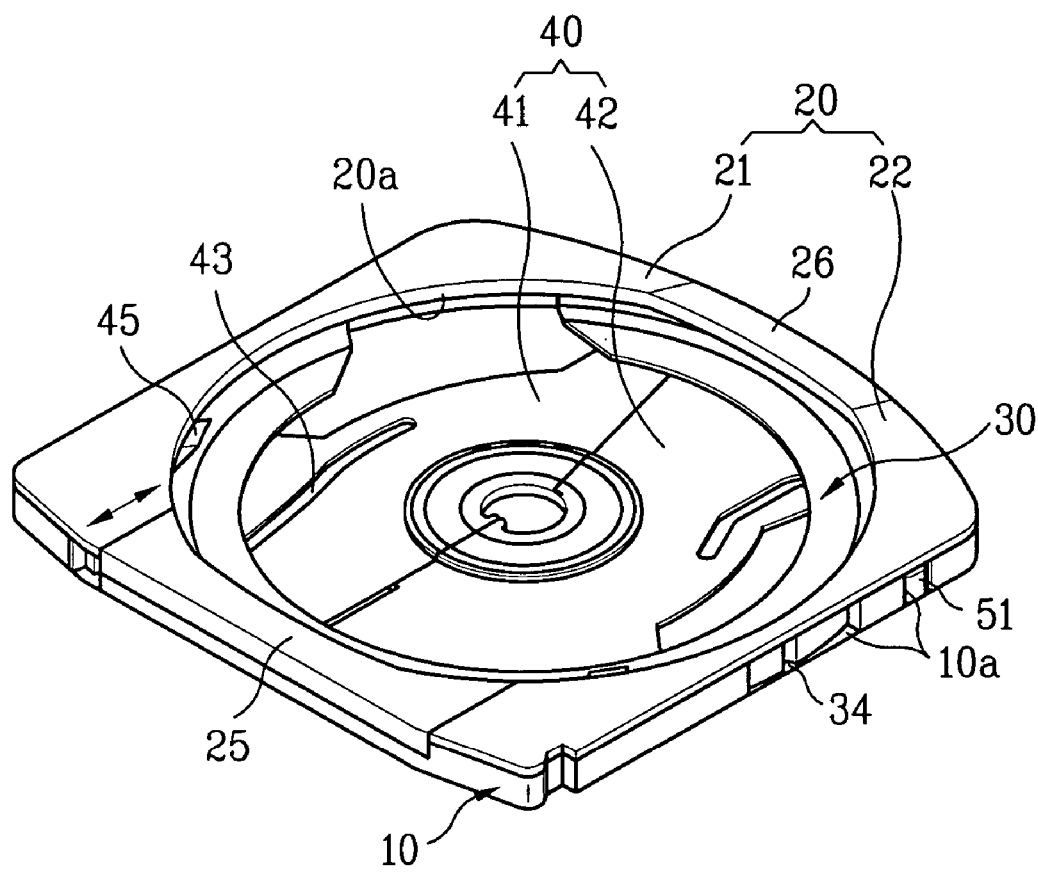
FIG. 5 is a perspective diagram of the disc cartridge assembly in FIG. 4.

FIG. 4 is a projected perspective diagram of a disc cartridge assembly according to one embodiment of the present invention and FIG. 5 is a perspective diagram of the disc cartridge assembly in FIG. 4.

Referring to FIG. 4 and FIG. 5, a disc cartridge includes a case comprising an upper case 20 and a lower case 10. The lower case 10 has a window W provided for accessing drive information. The upper case 20 is separated into a left upper case 21 and a right upper case 22 confronting each other centering around its central part, and an exposure window 20a exposing a label face of a disc is provided to the central part of the upper case 20.

A rotating ring 30, at which an outer circumference of the disc lands, is provided to insides of the upper and lower cases 20 and 10. First and second shutter parts 41 and 42, which are rotated centering on rotation shafts 11, respectively to open/close the window W, are provided below the rotating ring 30. And, holding protrusions 45 are provided to the first and second shutter parts 41 and 42 to hold an edge of the disc D, respectively.

Meanwhile, the disc cartridge further includes a rotating means for rotating the rotating ring 30 and a locking means for locking a rotation of the rotating ring 30 selectively.

A first separation-preventing member 25 is provided between the left and right upper cases 21 and 22 to prevent a separation of the disc D. Guide protrusions (not shown in the drawing) are provided to the first separation-preventing member 25 or the left and right upper cases 21 and 22 and guide recesses (not shown in the drawing) are provided to the left and right upper cases 21 and 22 or the first separation-preventing member 25. Preferably, the first separation-preventing member 25 is slid into a space between the left and right upper cases 21 and 22 to be assembled thereto. Moreover, in order to prevent the first separation-preventing member 25 from being separated from the space, the first separation-preventing member 25 and the left and right upper cases 21 and 22 are preferably fixed to each other by snap fitting.

A second separation-preventing member 26 is provided to an opposite side of the first separation-preventing member 25. The second separation-preventing member 26 is placed within an area of the rotation ring 30 to prevent the separation of the loaded disc D. And, an upper surface of the second separation-preventing member 26 is gradually tilted downward toward its outside.

The disc cartridge includes a first link means for moving the first and second shutter parts 41 and 42 and a second link means for enabling the holding protrusions 45 to release the edge of the disc D when the first and second shutter parts 41 and 42 are moved.

The first link means includes slots 43 provided to the first and second shutter parts 41 and 42, respectively and protrusions 31 formed on the rotating ring 30 to be inserted in the corresponding slots 43, respectively. Hence, as the rotating ring 30 is rotated, the protrusions 31 push rims of the slots 43 to move the first and second shutter parts 41 and 42, respectively.

And, the second link means includes the holding protrusions 45 and guide rails 23 formed at bottoms of the left and right upper cases 21 and 22 to correspond to the holding protrusions 45, respectively. Hence, as the first and second shutter parts 41 and 42 are moved, the holding protrusions 45 are slid into the guide rails 23 to hold or release the edge of the disc D. In this case, each of the holding protrusions 45 has a channel type cross-section to support a top and bottom of the edge of the disc D.

Moreover, stepped portions 41*a* and 42*a* are provided to confronting sides of the first and second shutter parts 41 and 42 coming contact with each other, respectively. The stepped portions 41*a* and 42*a* are overlapped with each other to enhance rigidity of the confronting sides of the first and second shutter parts 41 and 42.

Meanwhile, the rotating means includes a gear part 32 provided to one side of an outer circumference of the rotating ring 30 and first and second hanging recesses 34 and 33 provided to the outer circumference of the rotating ring 30 next to both sides of the gear part 32.

And, the locking means includes a locking protrusion 53, an elastic piece 52, and a locking lever 50. The locking protrusion 53 is locked into the second hanging recess 33 of the rotating ring 30 and the elastic piece 52 is provided to exert a force of restitution in a direction toward which the locking protrusion 53 is locked into the second hanging recess 33.

Moreover, the locking lever 50 has a handling protrusion 51 so that the locking protrusion 53 can escape from the second hanging recess 33. Namely, if the handling protrusion 51 is pressed, the locking protrusion 53 is separated from the second hanging recess 33. In doing so, the locking lever 50 is turned centering on a rotational shaft 12 provided to the lower case 10.

Meanwhile, the rotating ring 30 and the handling protrusion 51, as shown in FIG. 5, are exposed outside via control slots 10*a* formed between the right upper case 22 and lower case 10 of the disc cartridge.

A process of unloading the disc D from the disc cartridge is explained as follows.

First of all, once the handling protrusion 51 of the locking lever 50 is pressed, the locking lever 50 is turned to separate the locking protrusion 53 from the second hanging recess 33 so that the rotating ring 30 becomes rotatable.

Simultaneously, once the rotating ring 30 is rotated, the interoperating protrusions 31 push the interoperating slots 43 provided to the first and second shutter parts 41 and 42, respectively so that the first and second shutter parts 41 are turned centering on the rotation shafts 11, respectively. In doing so, the window W provided to the lower case 10 is opened via a gap between the separated shutter parts 41 and 42.

Moreover, the moment the window W is open due to the first and second shutter parts 41 and 42 separated from each other, the holding protrusions 45 are slid in a direction getting farther from a center of the disc D along the guide rails 23, respectively to release the holding state of the disc D.

Subsequently, the first separation-preventing member 25, as shown in FIG. 5, is pushed away to escape from the domain of the rotating ring 30. The disc D is then unloaded upward via the exposure window 20*a*. And, a process of loading the disc D in the disc cartridge can be performed in a reverse manner of the unloading process of the disc D.

Meanwhile, in order to facilitate the process of unloading the disc D from the above-configured disc cartridge, a disc separating apparatus can be used.

A disc separating apparatus according to the present invention is explained in detail with reference to the attached drawings as follows.

Figure 6:
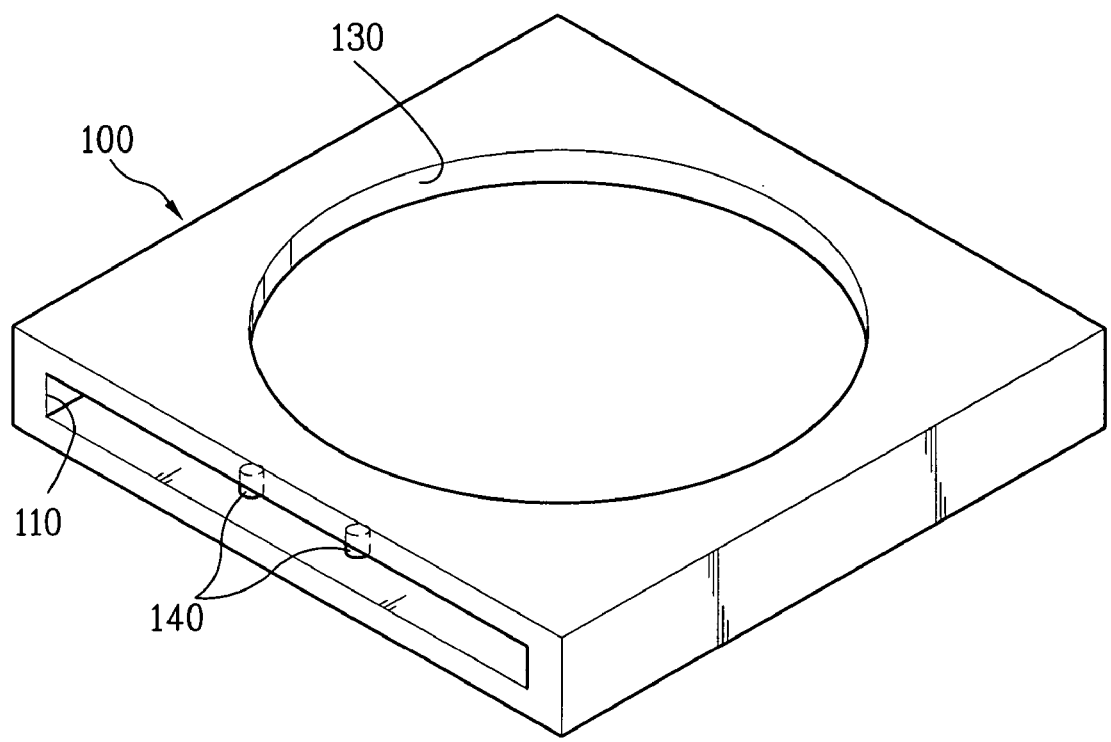
FIG. 6 is a perspective diagram of a disc separating apparatus according to a first embodiment of the present invention.
Figure 8B:
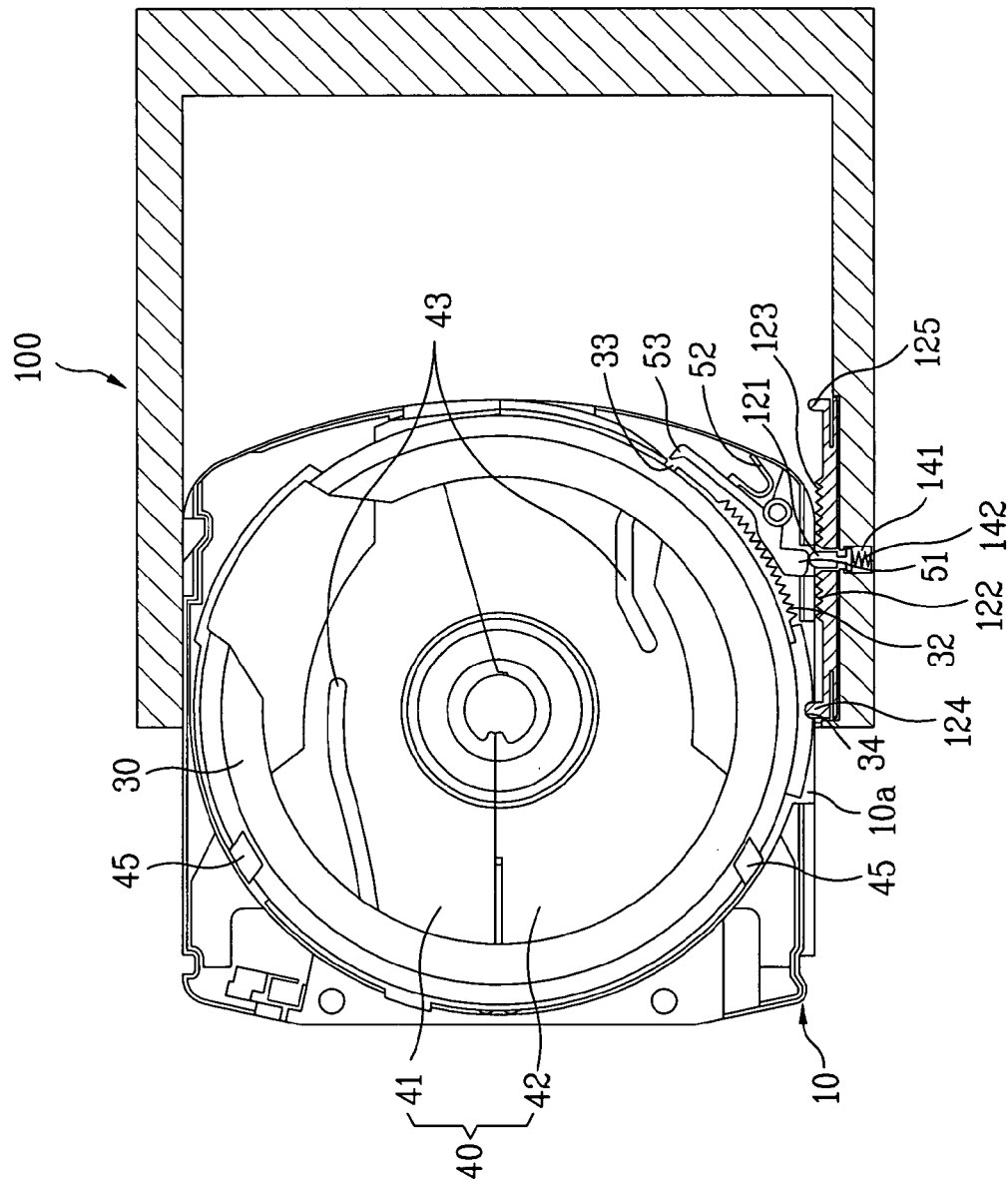
Figure 8C:
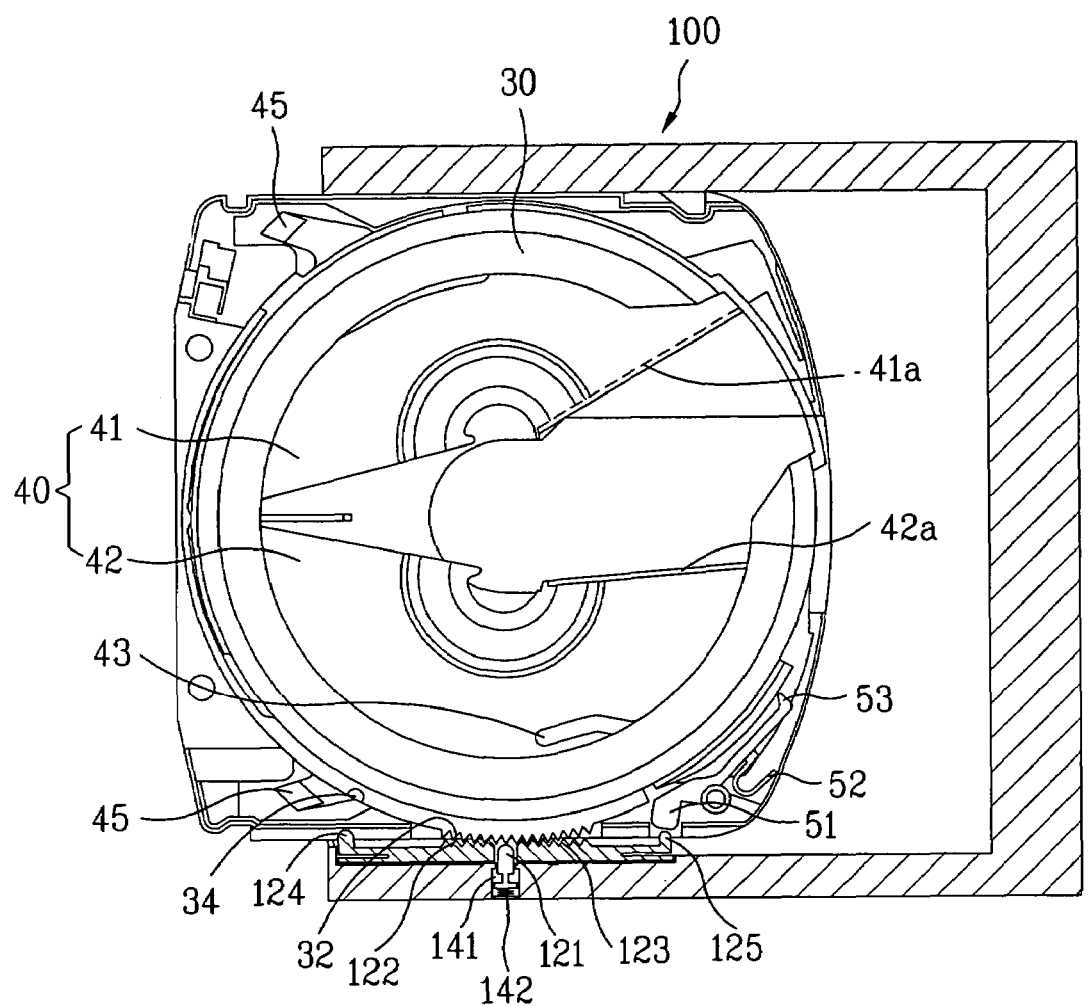
Figure 8D:
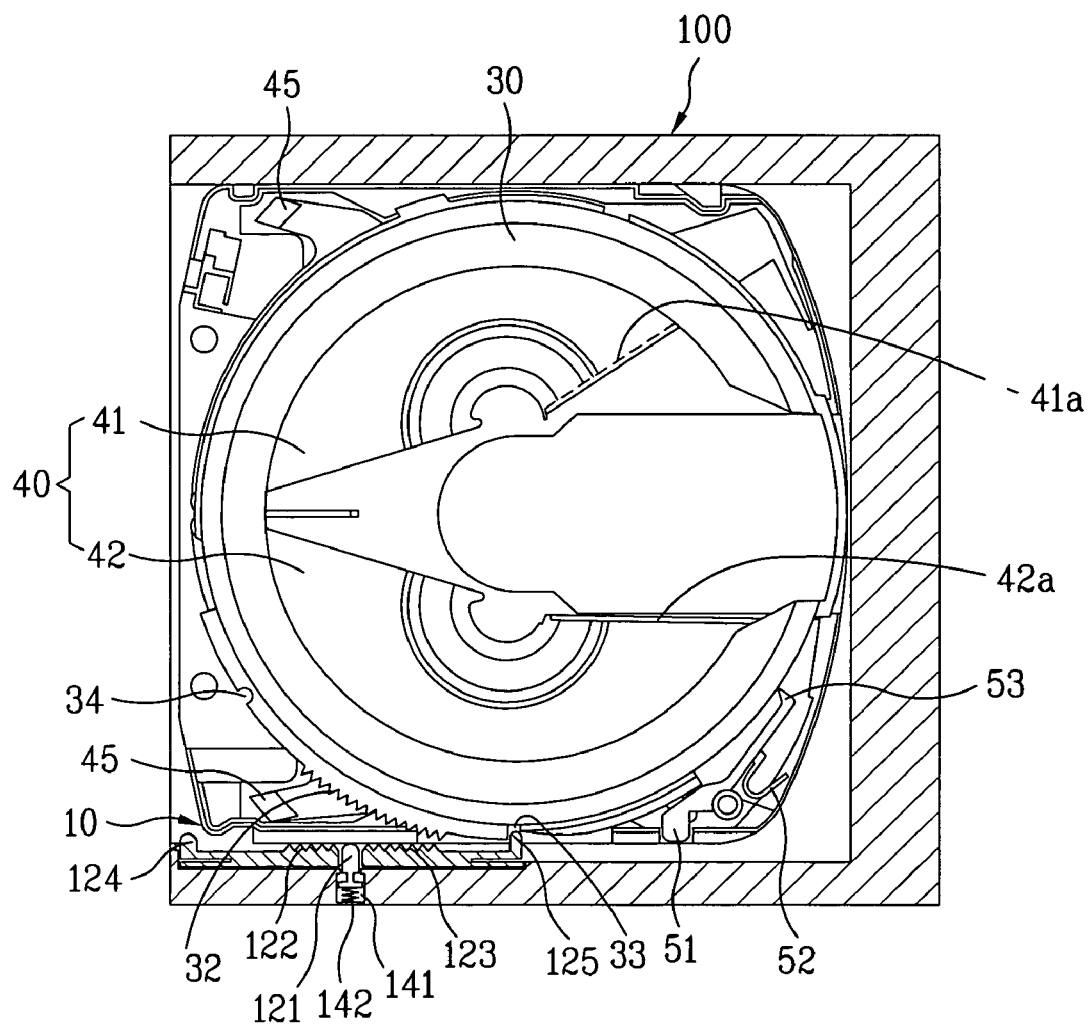
Figure 9:
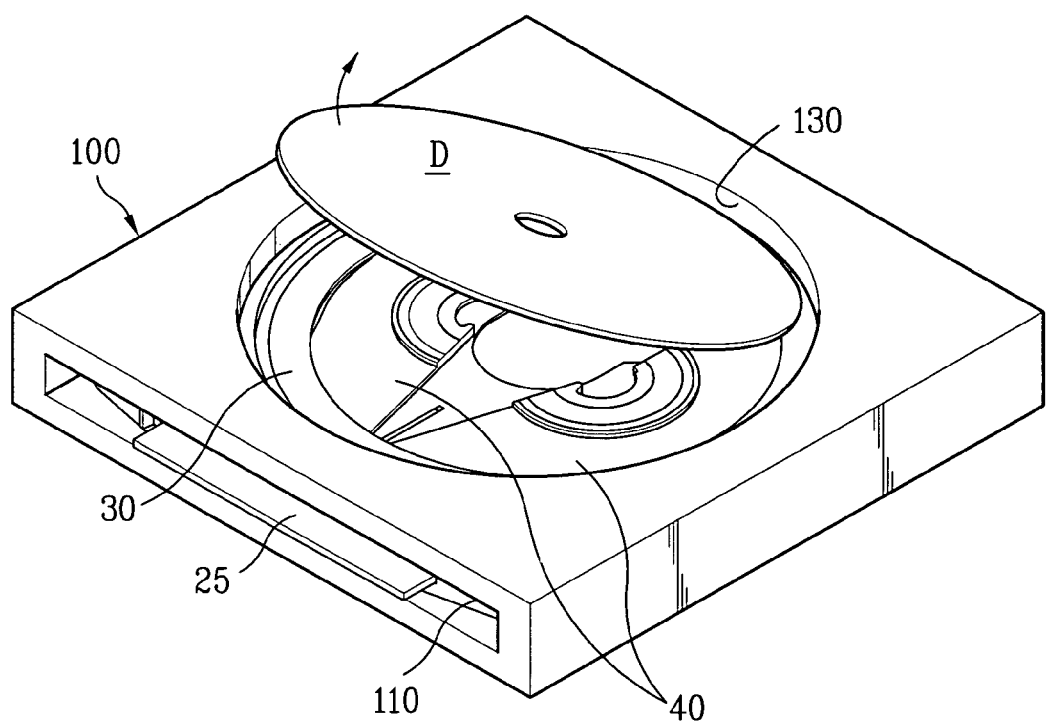
FIG. 9 is a perspective diagram of a disc separated by the disc separating apparatus.

FIG. 6 is a perspective diagram of a disc separating apparatus according to a first embodiment of the present invention, FIG. 7 is a cross-sectional diagram of the disc separating apparatus in FIG. 6, FIGS. 8A to 8D are diagrams of an interoperating structure between the disc separating apparatus in FIG. 6 and the disc cartridge in FIG. 4, and FIG. 9 is a perspective diagram of a disc separated by the disc separating apparatus.

Referring to FIG. 6 and FIG. 7, an entrance 110 is provided to a front side of a disc separating apparatus 100 having a shape of an about rectangular case. A link device interoperating with the rotating means of the disc to rotate the rotating ring is provided within one side of the separating apparatus 100. And, an opening 130, via which the disc D released from the disc cartridge is unloaded, is provided to a topside of the separating apparatus 100.

The link device includes a locking release protrusion 121, first and second opening gears 122 and 123, and first and second hanging protrusions 124 and 125.

The locking release protrusion 121 releases a rotational locking of the rotating ring 30 when the disc cartridge is inserted. The first and second opening gears 122 and 123 are provided to both sides of the locking release protrusion 121 to rotate the rotating ring 30 while the rotational locking of the rotating ring 20 is released. The first hanging protrusion 124 is built in one body of the first opening gear 122 to provide an initial rotational force to the rotating ring 30. The second hanging protrusion 125 is built in one body of the second opening gear 123 to prevent a free rotation of the rotating ring 30 while the disc cartridge is loaded.

The locking release protrusion 121 is coupled to an elastic member 142 to be provided to an insertion hole 141 provided to a portion of an inside of the disc separating apparatus 100. Thus, the locking release protrusion 121 enables to move elastically. Moreover, each of the first and second hanging protrusions 124 and 125 is provided with a force of restitution in a direction of interfering with the rotating ring 30. Alternatively, the first and second hanging protrusions 124 and 125 can be separated from the first and second opening gears 122 and 123 to be provided with the configuration of the locking release protrusion 121, respectively.

A process of unloading the disc loaded in the disc cartridge using the disc separating apparatus 100 is explained with reference to FIGS. 8A to 9 as follows.

Referring to FIG. 8A, once the disc cartridge is inserted via the entrance 110 of the disc separating apparatus 100, the rotating means exposed via the control slot 10a of the disc cartridge interferes with the link device provided within the disc separating apparatus 100.

Specifically, on the early stage of the insertion of the disc cartridge, the handling protrusion 51 of the locking lever 50 provided to the disc cartridge interferes with the locking release protrusion 121 of the link device to turn the locking lever 50. In doing so, the locking protrusion 53 of the locking lever 50 is separated from the second hanging recess 33 of the rotating ring 30.

Hence, the rotating ring 30 is in a rotatable state. And, the first hanging protrusion 124 of the link device is inserted in the first hanging recess 34 of the rotating ring 30 to rotate the rotating ring 30 slightly until the gear part 32 of the rotating ring 30 engages with the first opening gear 122 of the link device. The rotating ring 30 is then rotated by the rotational force so that the gear part 32 of the rotating ring 30 engages with the first opening gear 122 of the link device to keep rotating the rotating ring 30.

If the disc cartridge keeps being inserted while the above-state is maintained, the locking release protrusion 121 of the link device is inserted in the insertion groove 141 by the interference of the gear part 32 of the rotating ring 30 and the gear part 32 engaging with the first and second opening gears 122 and 123 to keep being rotated.

Hence, once the disc cartridge is completely inserted in the disc separating apparatus 100, the second hanging protrusion 125 of the link device, as shown in FIG. 8D, is inserted in the second hanging recess 33 of the rotating ring 30 to hold the rotation of the rotating ring 30.

Meanwhile, as the rotating ring 30 is rotated in the course of inserting the disc cartridge, the first and shutter parts 41 and 42 of the disc cartridge are turned to open the window W.

Namely, as the rotating ring 30 is rotated, the link protrusions 31 push to move the slots 43 provided to the first and second shutter parts 41 and 42 to rotate centering on the rotation shafts 11, respectively. In doing so, the window W is opened via the gap occurring between the shutter parts.

As the first and second shutter parts 41 and 42 are separated from each other to open the window W, the holding protrusions 45 provided to the first and second shutter parts 41 and 42 are slid along the guide rails 23 in directions getting farther from the center of the disc D to release the locking state of the disc D, respectively.

In the course of inserting the disc cartridge in the disc separating apparatus 100, the first separation-preventing member 25 is caught on the interference protrusions 140 provided over the entrance 110 of the disc separating apparatus 100 and is then slid outside to escape from the domain of the rotating ring 30.

After completion of inserting the disc cartridge in the disc separating apparatus 100, the disc D is unloaded upward via the exposure window 20a of the disc cartridge and the opening 130 of the disc separating apparatus 100.

Figure 10:
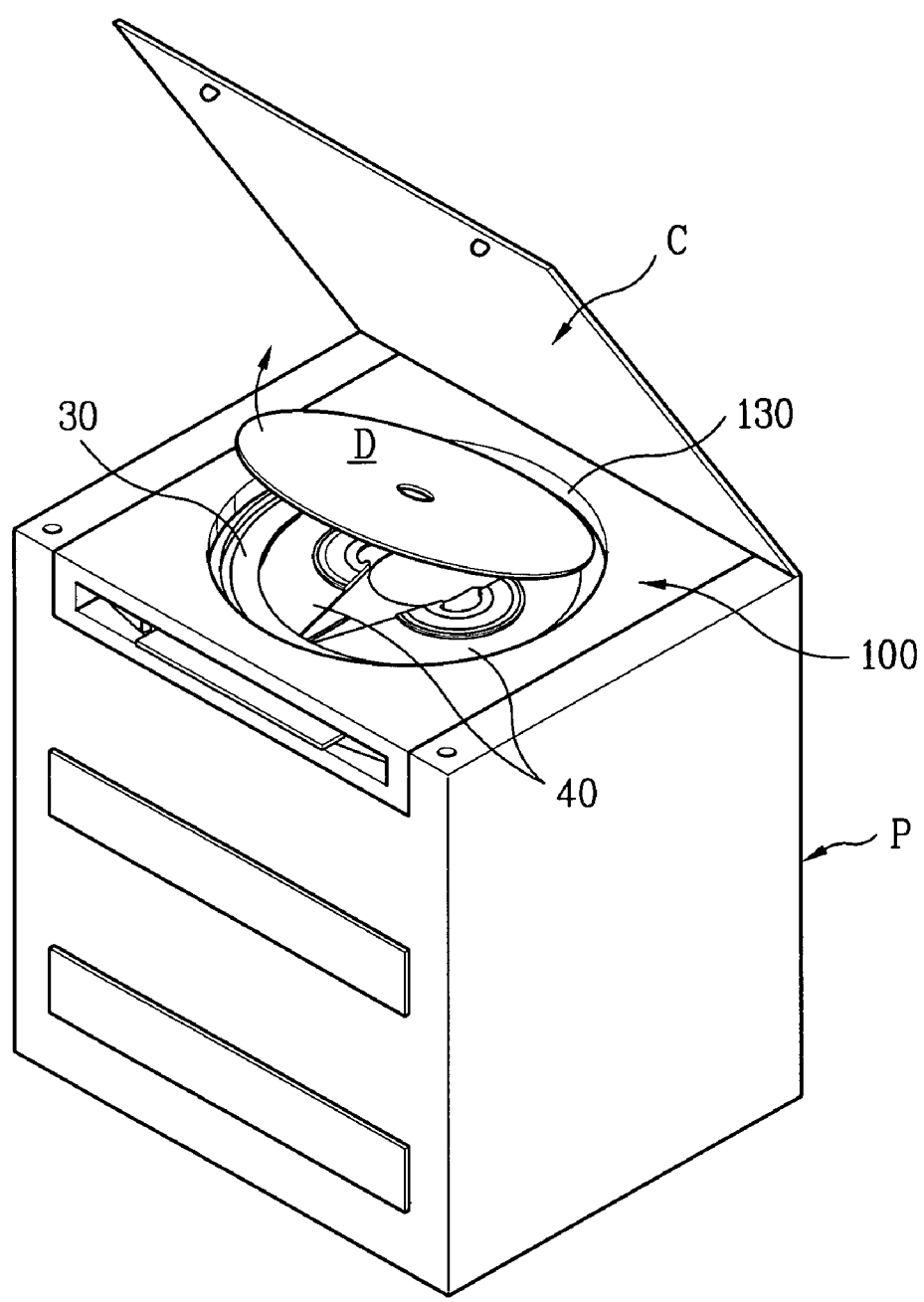
FIG. 10 is a perspective diagram of the disc separating apparatus installed in a product body.

Meanwhile, FIG. 10 shows a perspective view of the disc separating apparatus installed in a product body. When the disc separating apparatus, as shown in the drawing, is installed at the product body P, the opening 130 provided to the topside of the disc separating apparatus 100 is exposed outside.

In order to prevent particles such as dust and the like from entering the disc separating apparatus 100 via the opening 130, a cover C is preferably provided to the topside of the disc separating apparatus 100 to open/close the opening 130.

Figure 11:
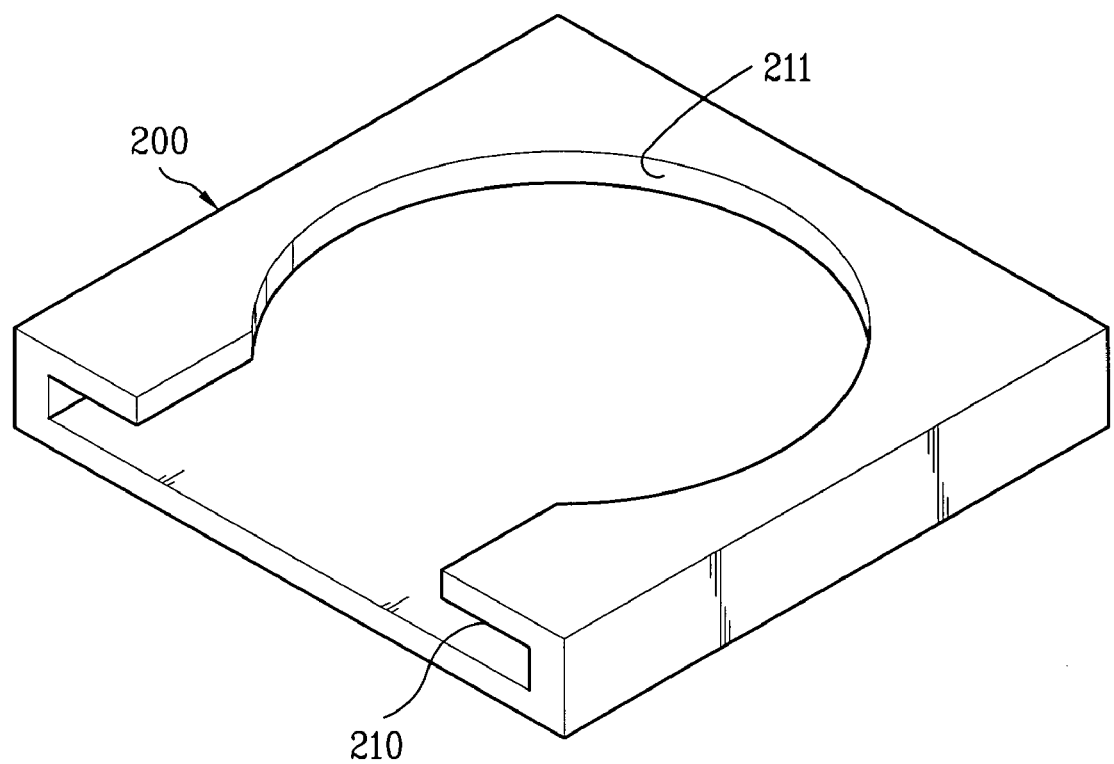
FIG. 11 is a perspective diagram of a disc separating apparatus according to a second embodiment of the present invention.
Figure 12:
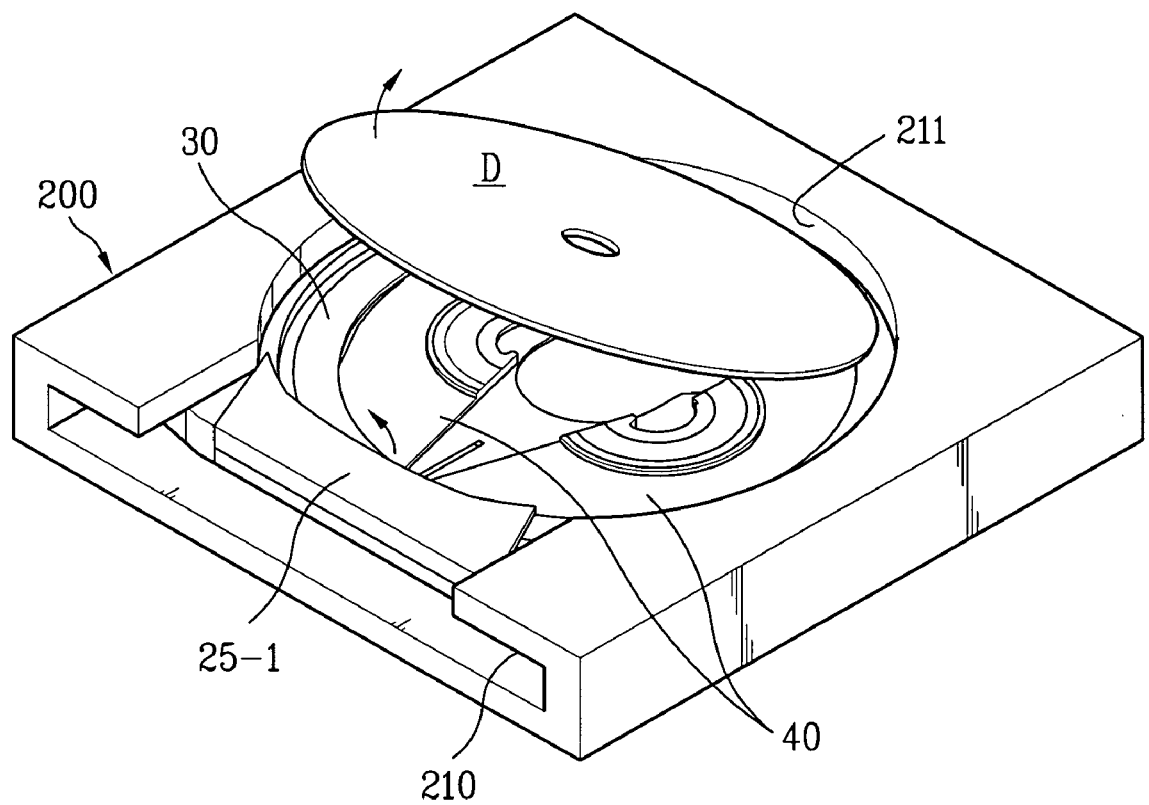
FIG. 12 is a perspective diagram of a disc separated by the disc separating apparatus.

FIG. 11 is a perspective diagram of a disc separating apparatus according to a second embodiment of the present invention and FIG. 12 is a perspective diagram of a disc separated by the disc separating apparatus.

Referring to FIG. 11 and FIG. 12, an upper side of an entrance 210 of a disc separating apparatus 200 is open.

A separation-preventing member 25-1 of the disc cartridge is hinge-jointed to the disc cartridge. The separation-preventing member 25-1 is turned upward/downward to release/hold the disc.

Hence, the disc separating apparatus 200 according to the second embodiment of the present invention facilitates to unload the disc D from the disc cartridge since the upper side of the opening 211 is open.

A disc cartridge assembly according to another embodiment of the present invention is explained with reference to FIGS. 13A to 18 as follows, in which the explanation of the same or like parts of the first embodiment of the present invention is skipped.

Figure 13A:
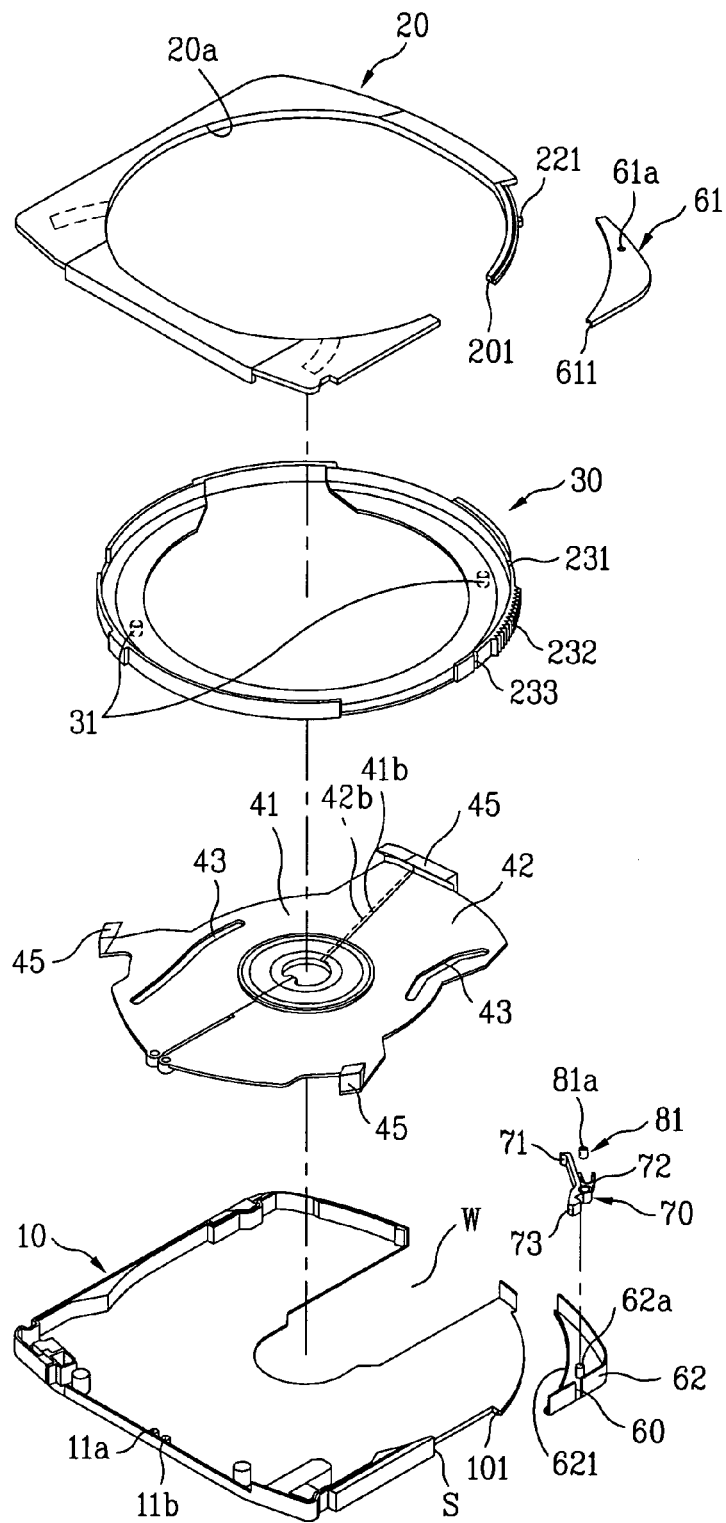
FIG. 13A is a projected perspective diagram of a disc cartridge assembly according to another embodiment of the present invention.
Figure 13B:
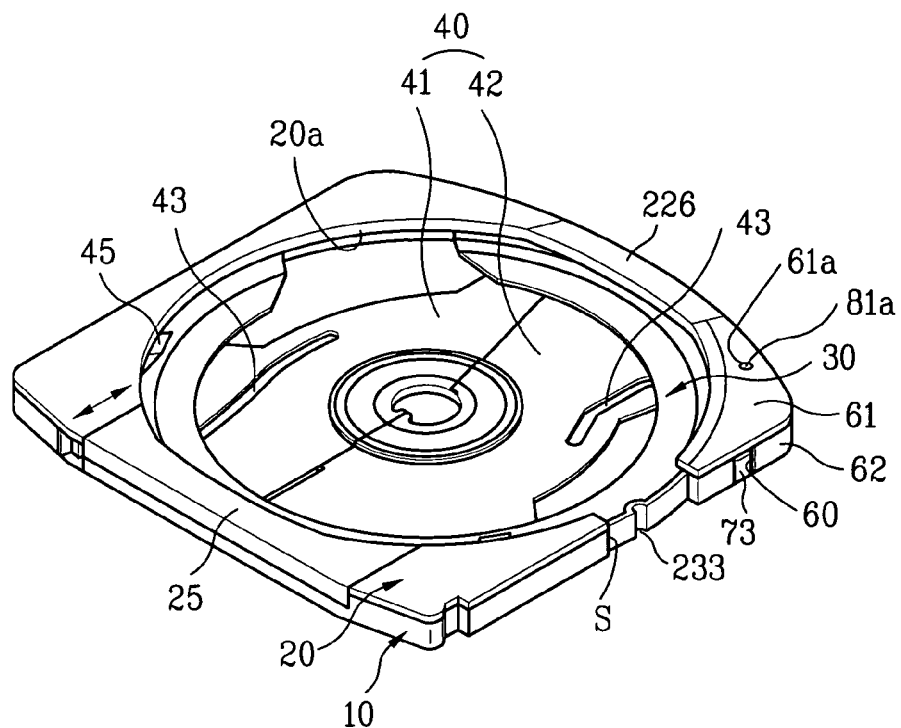
FIG. 13B is a perspective diagram of a disc cartridge assembly according to another embodiment of the present invention.

FIG. 13A is a projected perspective diagram of a disc cartridge assembly according to another embodiment of the present invention and FIG. 13B is a perspective diagram of a disc cartridge assembly according to another embodiment of the present invention.

Figure 1:
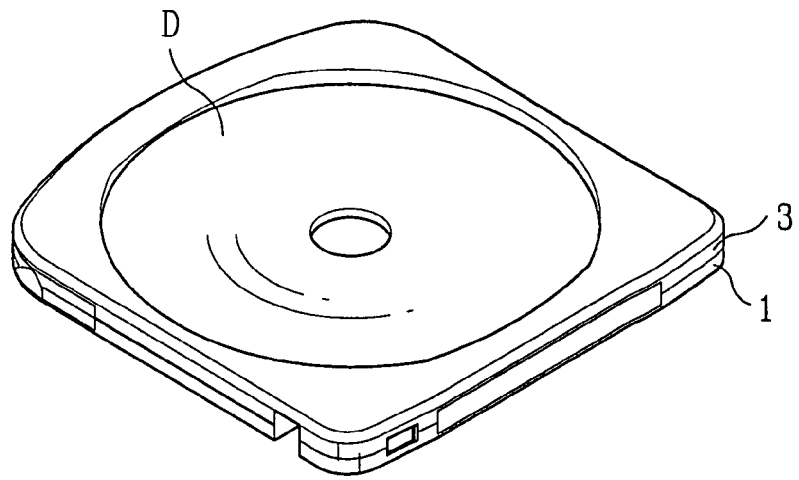
FIGS. 1 to 3 are perspective diagrams of a disc cartridge according to a related art.
Figure 2:
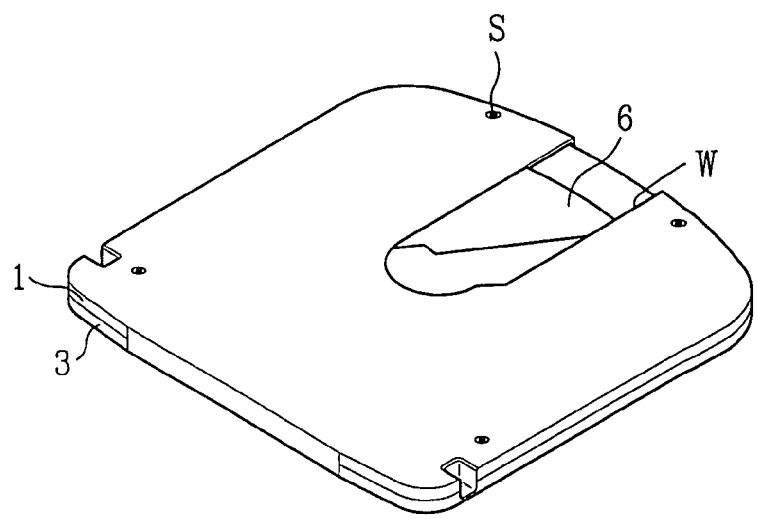
Figure 3:
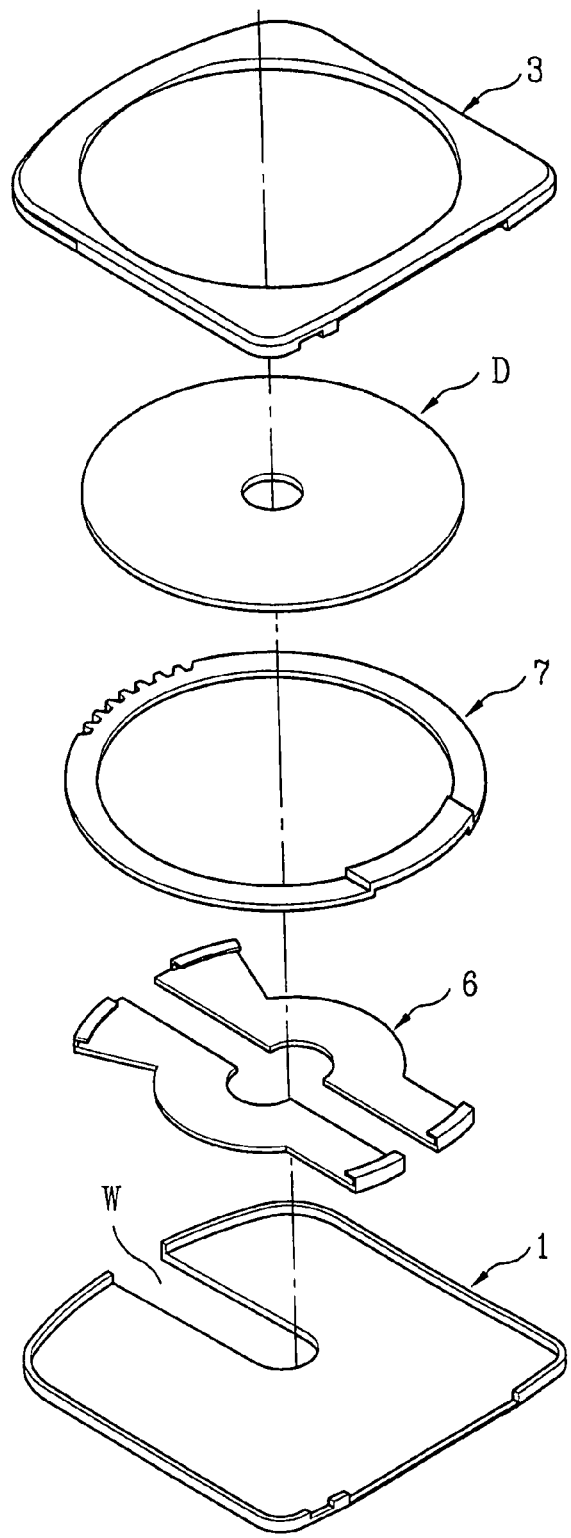
Figure 14:
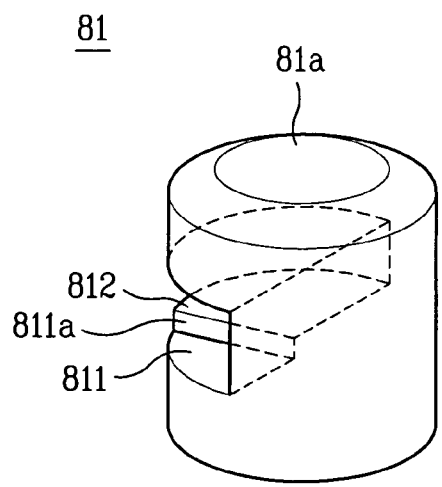
FIG. 14 is a perspective diagram of an elastic button.
Figure 15A:
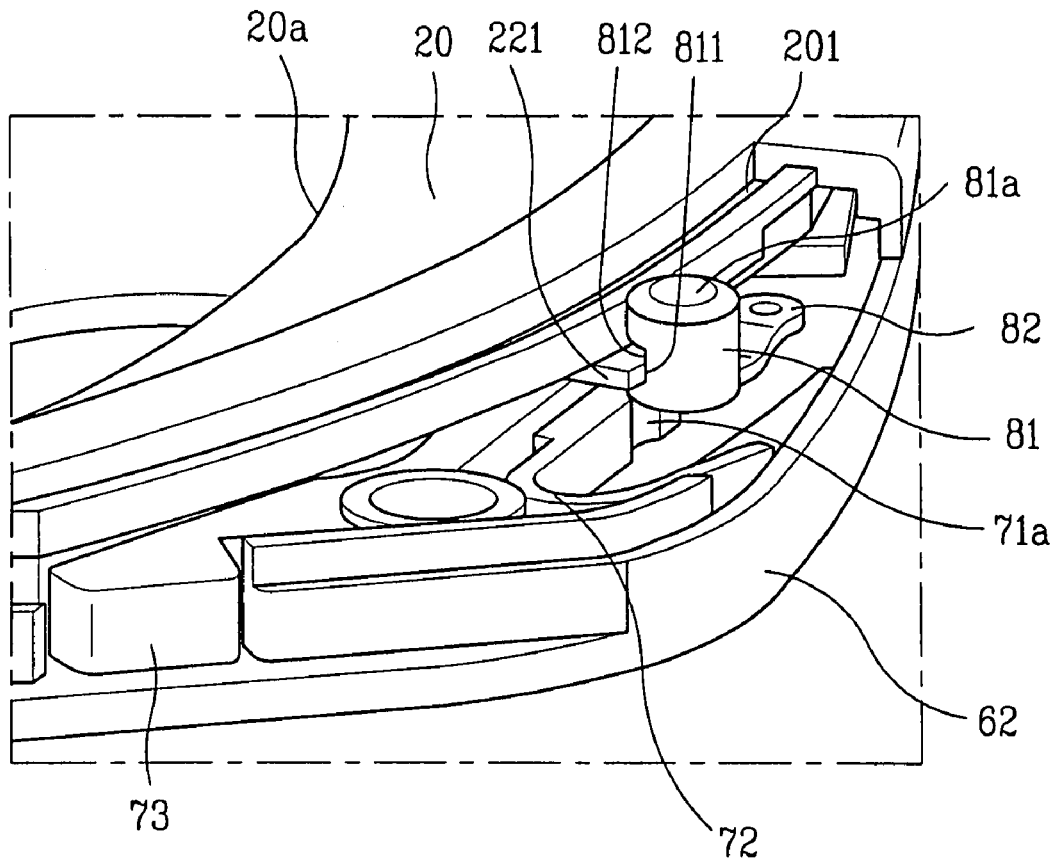
Figures 1, 15A:
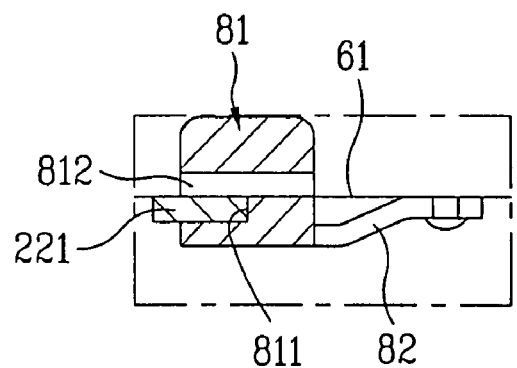
Figure 15B:
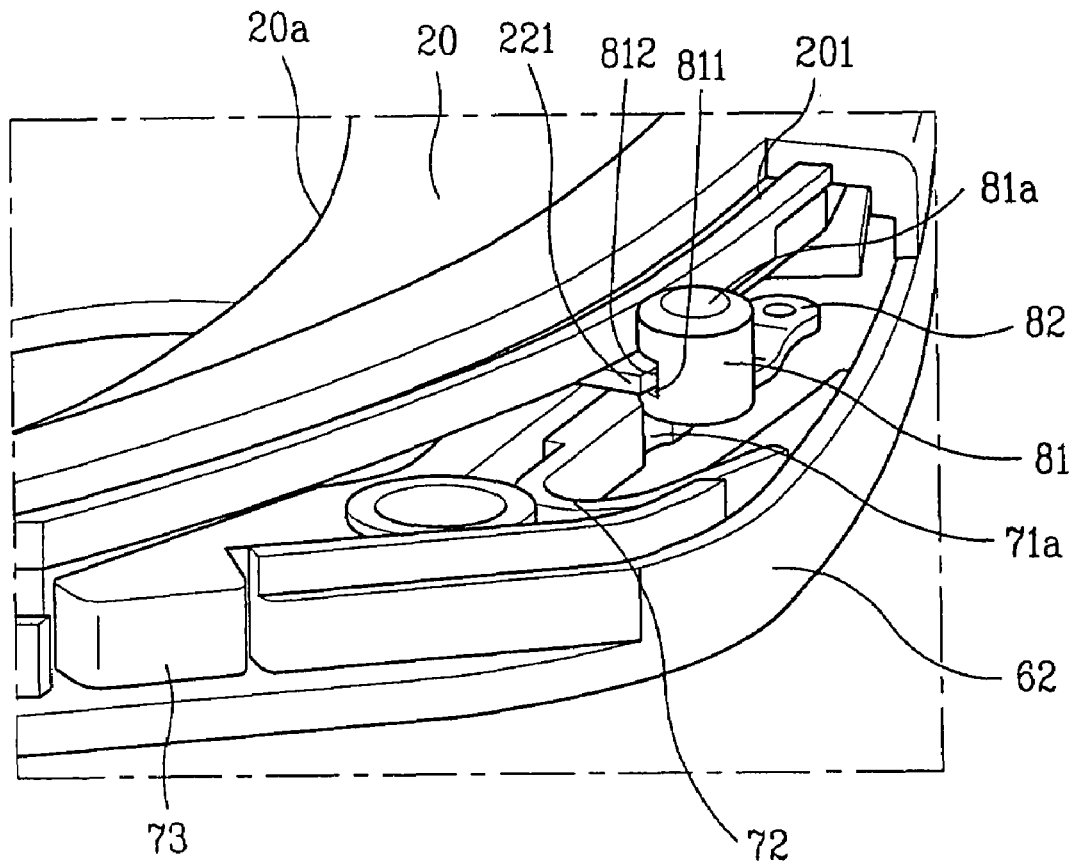
Figures 1, 15B:
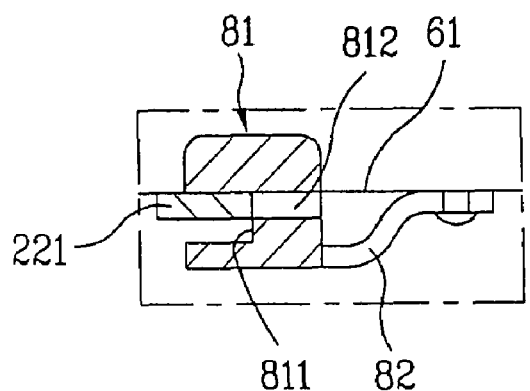

FIG. 14 is a perspective diagram of an elastic button and FIGS. 15A, 15A-1, 15A and FIG. 15B-1 are perspective and cross-sectional diagrams of an elastic button and movement-preventing protrusion assembled to each other, respectively.

Referring to FIGS. 13A to 14, a disc cartridge according to the present embodiment further includes a manual opening/closing module rotatably provided to slide in one sides of the cases 10 and 20. The manual opening/closing module is turned while assembled to the outer circumference of the rotating ring 30.

The manual opening/closing module includes upper and lower end moving parts 61 and 62, a locking lever 70, and a movement-preventing protrusion 221, and an elastic button 81.

The upper and lower end moving parts 61 and 62 are rotatably provided to slide in one-side corners of the upper and lower cases 10 and 20, respectively. The locking lever 70 is rotatably provided within the upper and lower end moving parts 61 and 62 to be coupled to the outer circumference of the rotating ring 30. Hence, the locking lever 70 selectively locks the rotation of the rotating ring 30.

The movement-preventing protrusion is projected from the upper case 20 toward insides of the upper and lower end moving parts 61 and 62. And, the elastic button 81 including a head part 81a exposed via an exposure hole 61a formed at the upper end moving part 61 is provided to the upper end moving part 61.

Slide portions 611 and 621 of the upper and lower end moving parts 61 and 62 come into contact with slide grooves 101 and 201 of the upper and lower cases 10 and 20 to be rotatably slid therein.

Meanwhile, the locking lever 70, which is coupled to a rotational shaft 62a provided to the lower end moving part 62, is turned overall centering on the rotational shaft 62a. A locking protrusion 71 provided to one end of the locking lever 70 is selectively locked/unlocked in/from to a locking recess 231 formed at the outer circumference of the rotating ring 30. For this, the locking protrusion 71 is elastically supported by an elastic piece 72 to have a force of restitution toward the locking recess 231. Moreover, a handling protrusion 73 is provided in one body to the locking lever 70. The handling protrusion 73 is pressed by an external force to separate the locking protrusion 71 from the locking recess 231. Alternatively, the elastic piece 72 can be replaced by a spring.

Referring to FIGS. 15A, 15A-1, 15B and FIG. 15B-1, an elastic rib 82 riveted to the upper end moving part 61 is connected to a lower end of the elastic button 81 to provide the force of restitution.

With the above configuration, the elastic button 81 is held at an initial position by a movement-preventing protrusion 221 prior to being pressed. Namely, the movement-preventing protrusion 221 is held by a movement-preventing sill 811a provided to a movement-preventing recess 811. Thereafter, after the elastic button 81 has been pressed once, the movement-preventing protrusion 221 deviates from the movement-preventing sill 811a to freely move along a movement recess 812.

FIGS. 16A, 16A-1, 16 and FIG. 16B-1 are perspective and cross-sectional diagrams for explaining interference between the elastic button and the locking lever, in which the upper case and upper end moving part are removed.

Figure 16A:
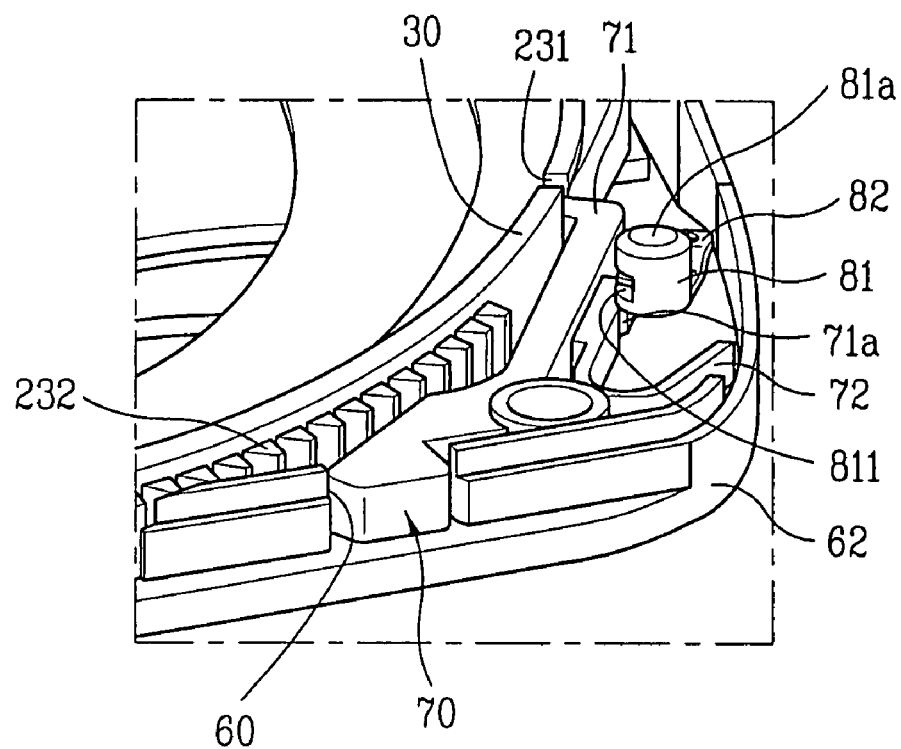
Figures 1, 16A:
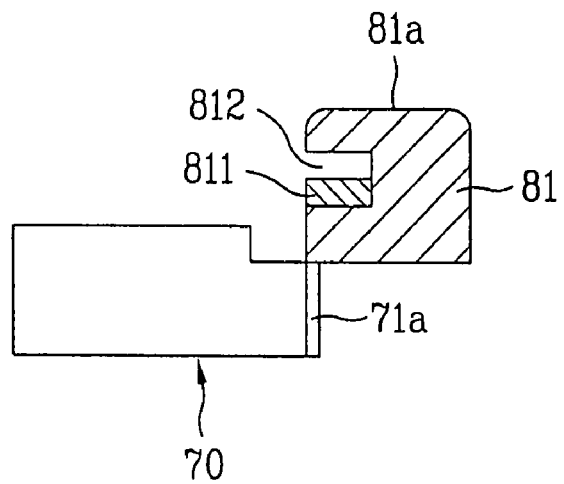
Figure 16B:
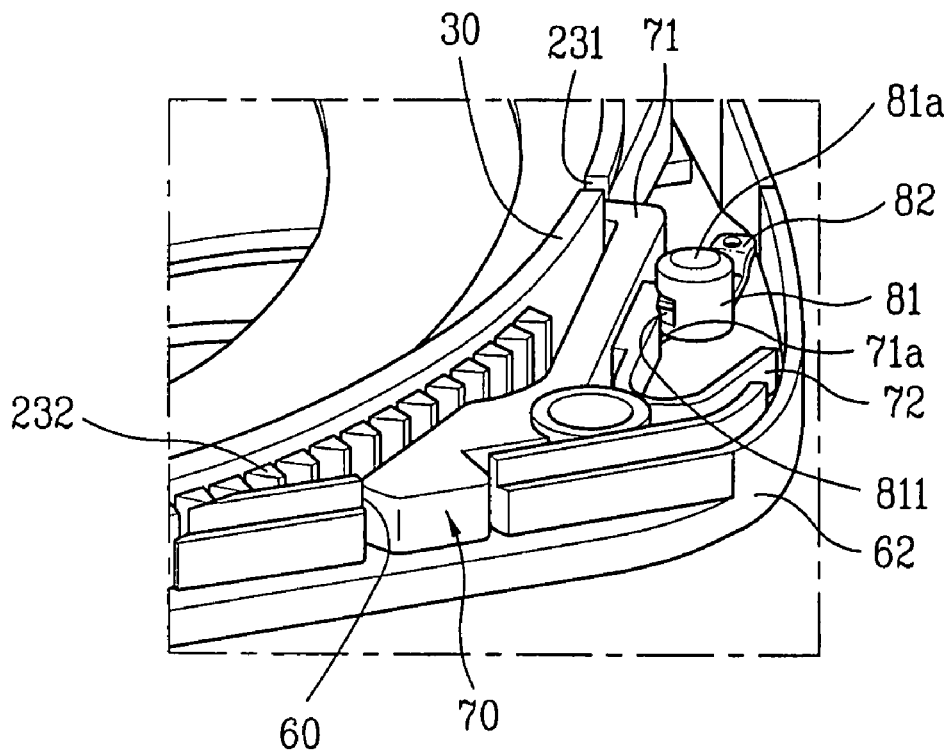
Figures 1, 16B:
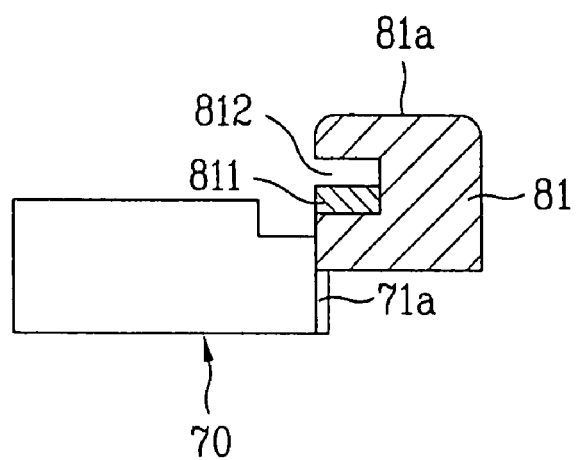

Referring to FIGS. 16A, 16A-1, 16B and 16B-1, while the elastic button 81 is held at the initial position by the movement-preventing protrusion 221 prior to being pressed, a lower end of the elastic button 81 is placed over a fixing recess 71a provided to one side of the locking protrusion 71. Hence, the locking lever 70 is lies in a rotatably movable status. Yet, after the elastic button 81 has been pressed, the lower end of the elastic button 81 adheres closely to the fixing recess 71a to prevent the rotation of the locking lever 70.

Figure 17:
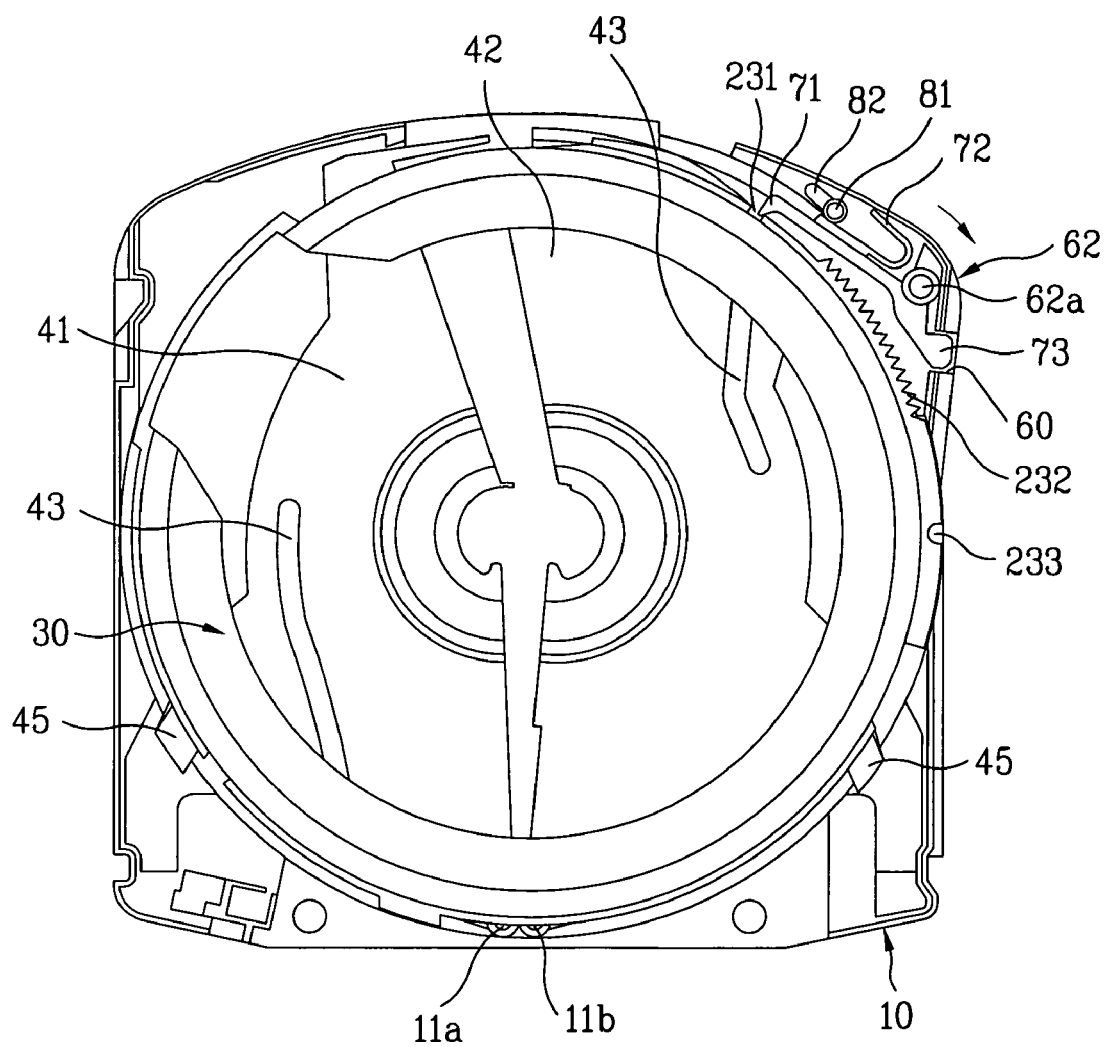
FIG. 17 is a layout of a disc cartridge.

Referring to FIG. 17, once the elastic button 81 is pressed, the lower end of the elastic button 81 is fitted in the fixing recess 71a of the locking lever 70. If the upper and lower end moving parts 61 and 62 are turned, the locking protrusion 71, which is being locked in the locking recess 31 of the rotating ring 30, is simultaneously rotated. Namely, the upper and lower end moving parts 61 and 62 are turned together with the rotating ring 30.

Meanwhile, the first separation-preventing member 25 is provided to one side of the upper case 20 to slide in the lower case 10. In case of being pushed in a direction of a center of the lower case 10, the first separation-preventing member 25 is placed within a domain of the disc D to prevent a separation of the disc D. And, a second separation-preventing member 226, of which inside tip is placed within the domain of the disc D, is provided to the other side of the upper case 20 to prevent the separation of the disc D. Preferably, the first separation-preventing member 25 is fixed to the upper case 10 by reciprocal snap fitting.

Meanwhile, slots 43, as shown in FIG. 13A, are provided to the left and right shutters 41 and 42, respectively. And, protrusions 231 inserted in the slots 43 are provided to the bottom of the rotating ring 30, respectively. Once the rotating ring 30 is rotated, the protrusions 231 push rims of the slots 43 to move the left and right shutters 41 and 42, respectively. Hence, the window W becomes open.

A process of separating the disc from the disc cartridge according to the present embodiment is explained with reference to the attached drawings as follows.

First of all, once the head part 81a of the elastic button 81 exposed over the upper end moving part 61 is pressed, the hanging protrusion 221 is switched to the state (cf. FIG. 15B) of being positioned at the movement recess 812 of the elastic button 81 from the state (cf. FIGS. 15A and 15A-1) of being positioned at the movement-preventing recess 811 of the elastic button. In doing so, the elastic button 81 becomes clockwise rotatable together with the upper and lower end moving parts 61 and 62.

Moreover, once the elastic button 81 is pressed, the lower end of the elastic button 81 comes into adhering closely to the fixing recess 71a provided to one side of the locking protrusion 71 of the locking lever 70 (cf. FIG. 16B and FIG. 16B-1). Hence, the locking protrusion. 71 is held by the locking recess 231 provided to the outer circumference of the rotating ring 30.

If the upper and lower end moving parts 61 and 62 are turned clockwise while the elastic button 81 is pressed, the locking lever 70 is turned together with the upper and lower end moving parts 61 and 62. In doing so, the locking protrusion 71 locked in the locking recess 31 turns the rotating ring 30 simultaneously.

Figure 18:
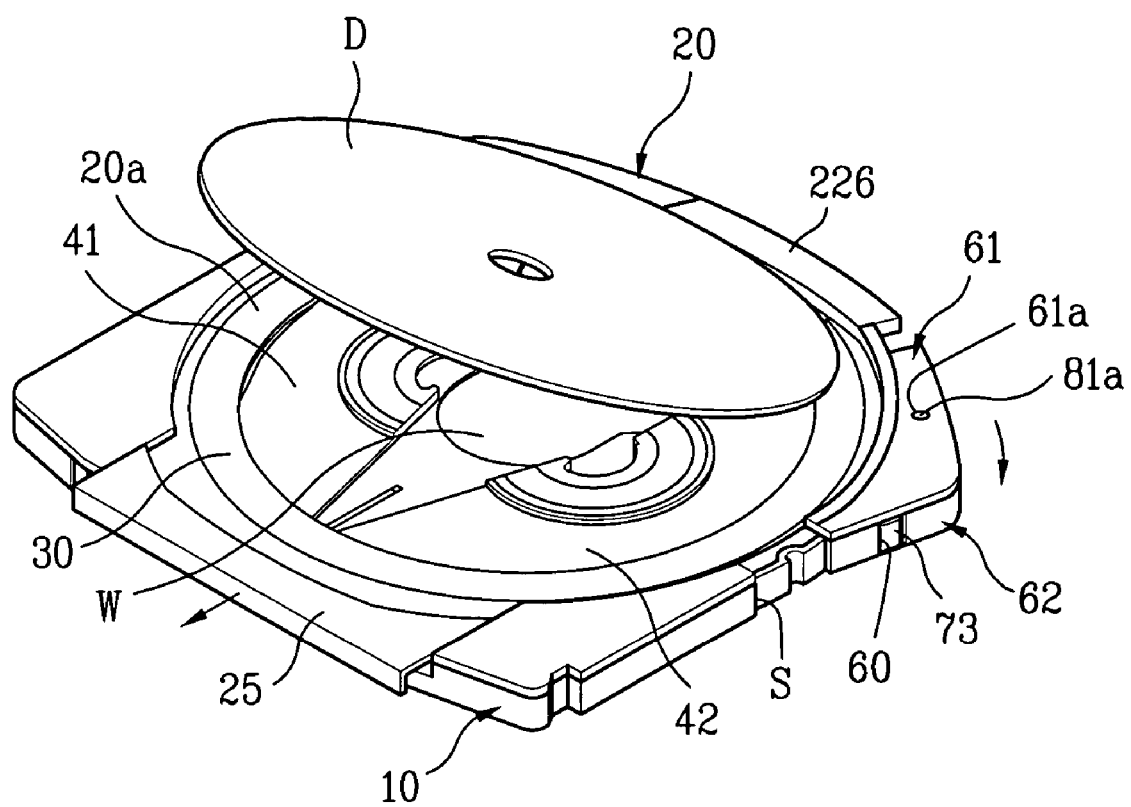
FIG. 18 is a perspective diagram of a disc cartridge.

The upper and lower end moving parts 61 and 62, as shown in FIG. 17 and FIG. 18, are preferentially turned clockwise and tips of the upper and lower end moving parts 61 and 62 are then stopped by one side of a control slot S (cf. FIG. 18) provided to the upper and lower cases 10 and 20.

Meanwhile, once the rotating ring 30 is rotated, the protrusions 31 provided to the rotating ring 30 push to move the rims of the slots 43 provided to the left and right shutters 41 and 42, respectively. Hence, the left and right shutters 41 and 42 are turned centering on the rotations shafts 11a and 11b, respectively. In doing so, the window W provided to the lower case 10 becomes open via the gap occurring between the shutters 41 and 42.

Moreover, the moment the left and right shutters 41 and 42 are separated from each other to open the window W, the holding protrusions 45 provided to the left and right shutters 41 and 42 are moved in a direction getting farther from the center of the disc D to release the locking state of the disc D.

Subsequently, once the first separation-preventing member 25 provided to the upper case 20 is externally pushed away, the exposure window 20a becomes fully open. Hence, the disc D can be unloaded upward via the exposure window 20a. Thus, it is facilitated to unload the disc D from the disc cartridge. And, a process of loading the disc D in the disc cartridge can be performed in a reverse manner of the unloading process of the disc D.

Meanwhile, a process of opening/closing the window of the disc cartridge for record/playback of the disc is explained as follows.

Referring to FIG. 13A and FIG. 13B, a gear part 232 and one operational recess 233 are further provided to the outer circumference of the rotating ring 30 together with the locking recess 231. The gear part 232 is exposed outside the disc cartridge and interoperates with an opening member (not shown in the drawing) installed within the disc drive. With such a configuration, after the window W provided to the disc cartridge has been fully open, the record/playback of the disc D is carried out.

Specifically, once the disc cartridge is loaded in the disc drive, the opening member presses the handling protrusion 73 of the locking lever 73 provided to the disc cartridge. In doing so, the locking protrusion 71 escapes from the locking recess 231 of the rotating ring 30.

Subsequently, if the disc cartridge keeps being inserted, the opening member interoperates with both of the operational recess 233 and the gear part 232 provided to the outer circumference of the rotating ring 30 to rotate the rotating ring 30.

As the rotating ring 30 is rotated, the protrusions 31 push the rims of the slots 43 provided to the left and right shutters 41 and 42 to move the left and right shutters 41 and 42, respectively, whereby the window W becomes open. Hence, the disc drive is placed in a state enabling the record/playback of disc information.

A disc cartridge assembly according to a further embodiment of the present invention is explained with reference to FIGS. 19A to 21C as follows, in which the explanation of the same or like parts of the foregoing embodiment of the present invention is skipped.

Figure 19A:
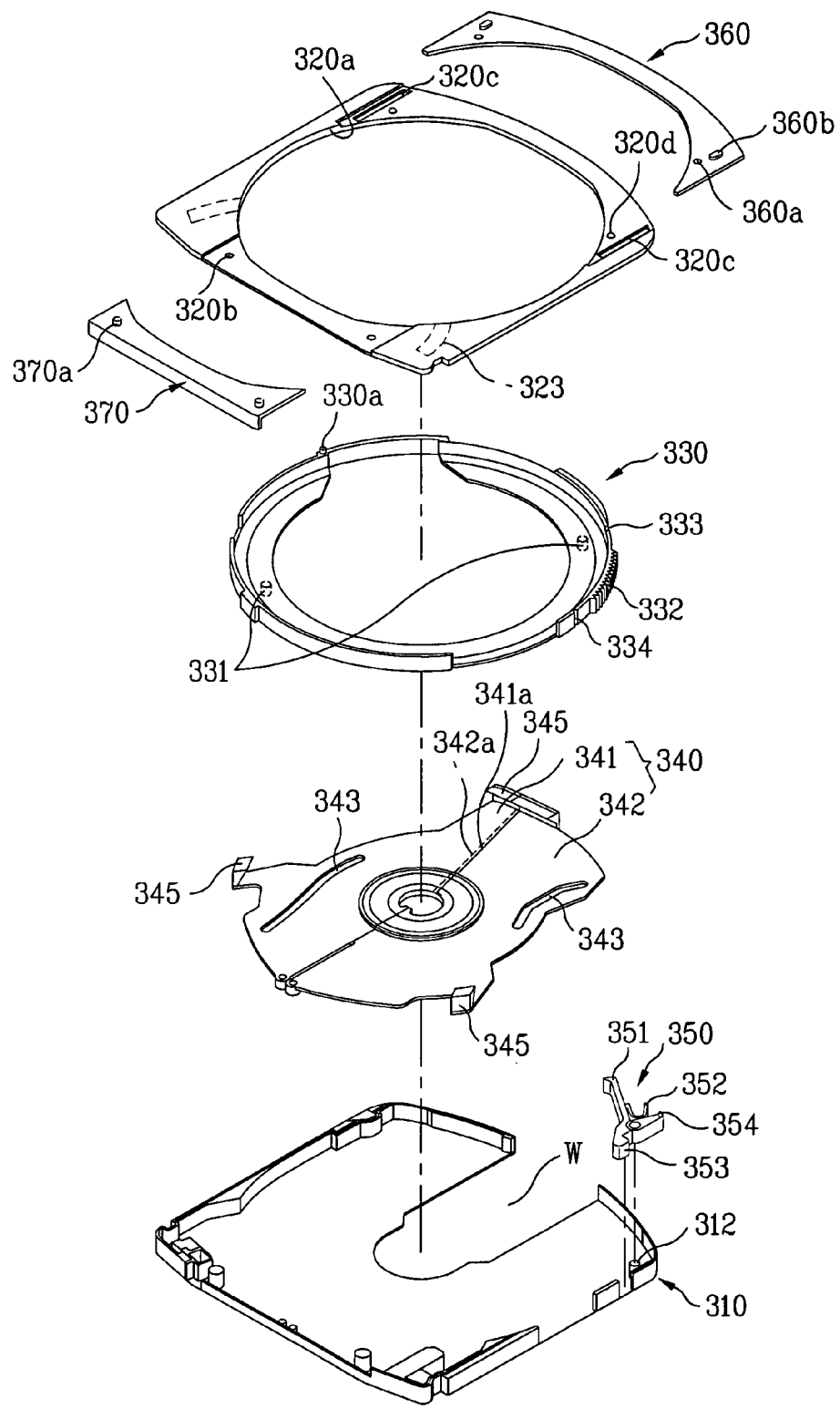
FIG. 19A is a projected perspective diagram of a disc cartridge according to a further embodiment of the present invention.
Figure 19B:
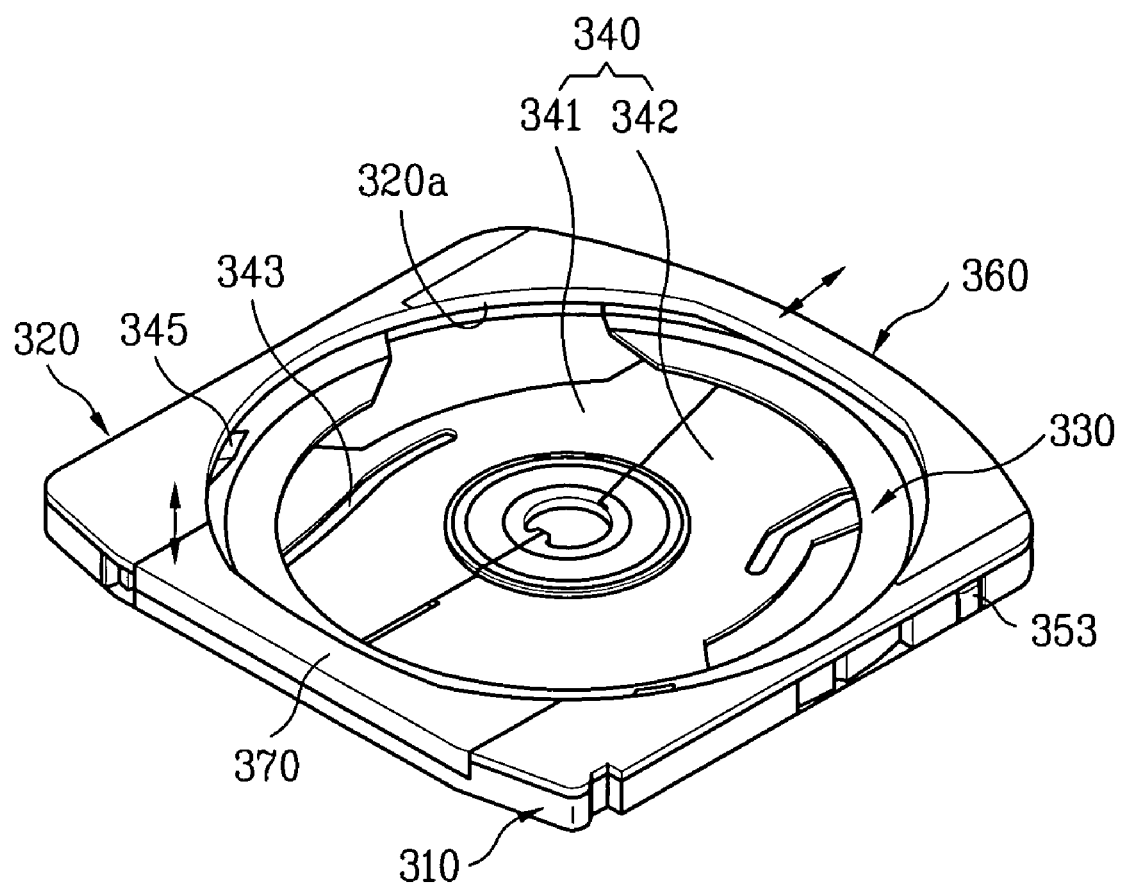
FIG. 19B is a perspective diagram of a disc cartridge according to a further embodiment of the present invention.

FIG. 19A is a projected perspective diagram of a disc cartridge according to a further embodiment of the present invention and FIG. 19B is a perspective diagram of a disc cartridge according to a further embodiment of the present invention.

Figure 20B:
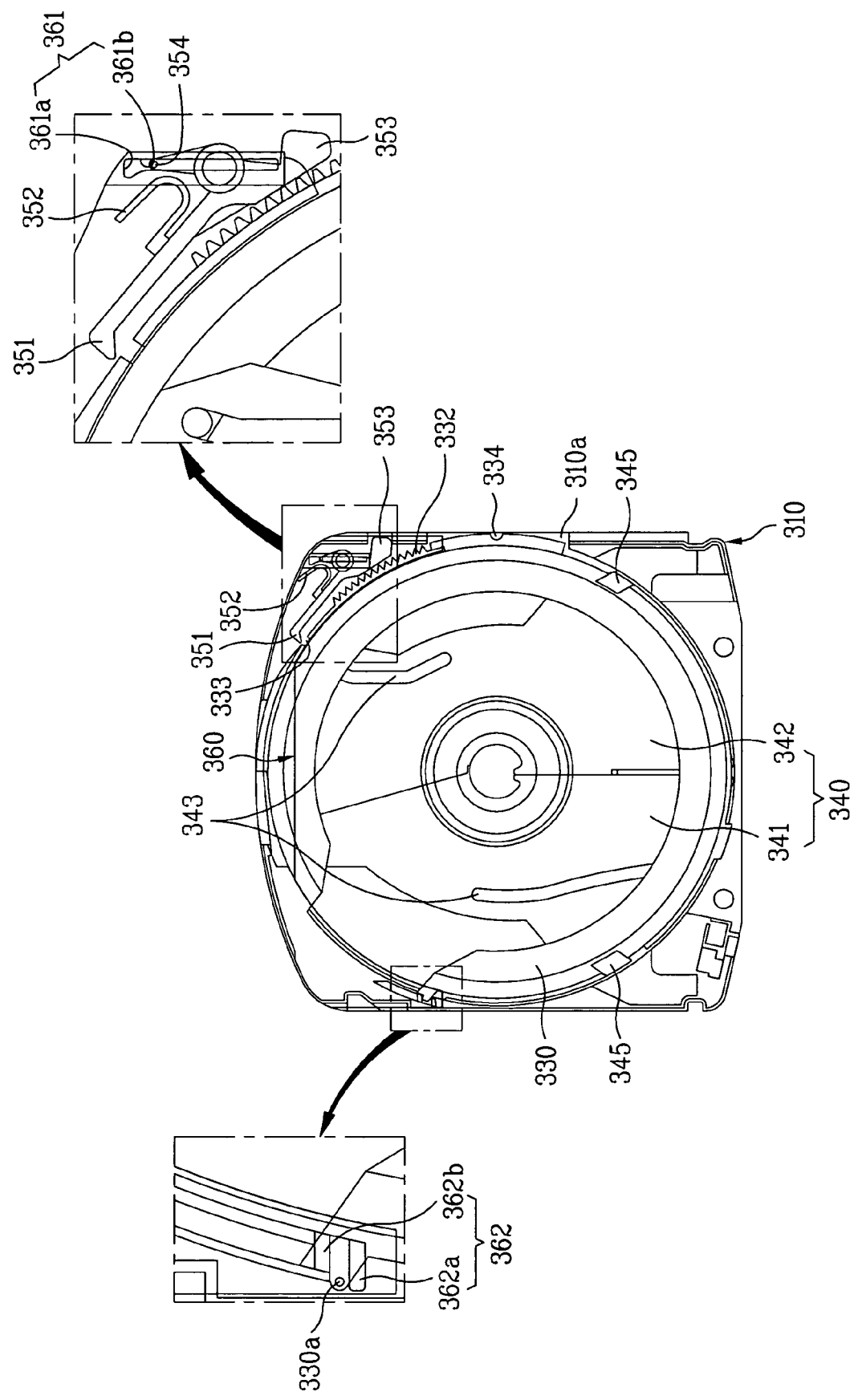
Figure 20C:
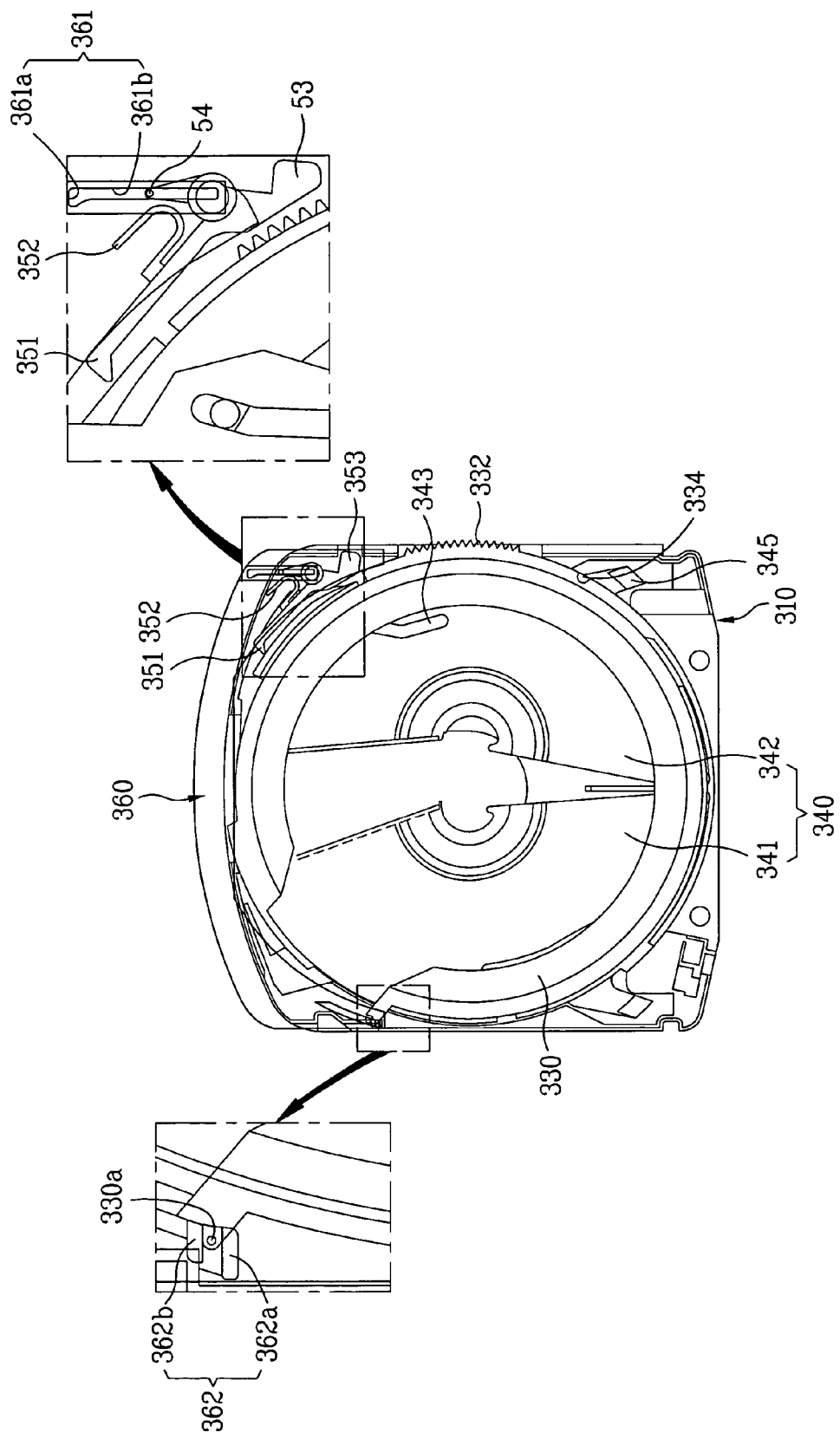

FIGS. 20A to 20C are layouts of a process of separating a disc from the disc cartridge.

Figure 21A:
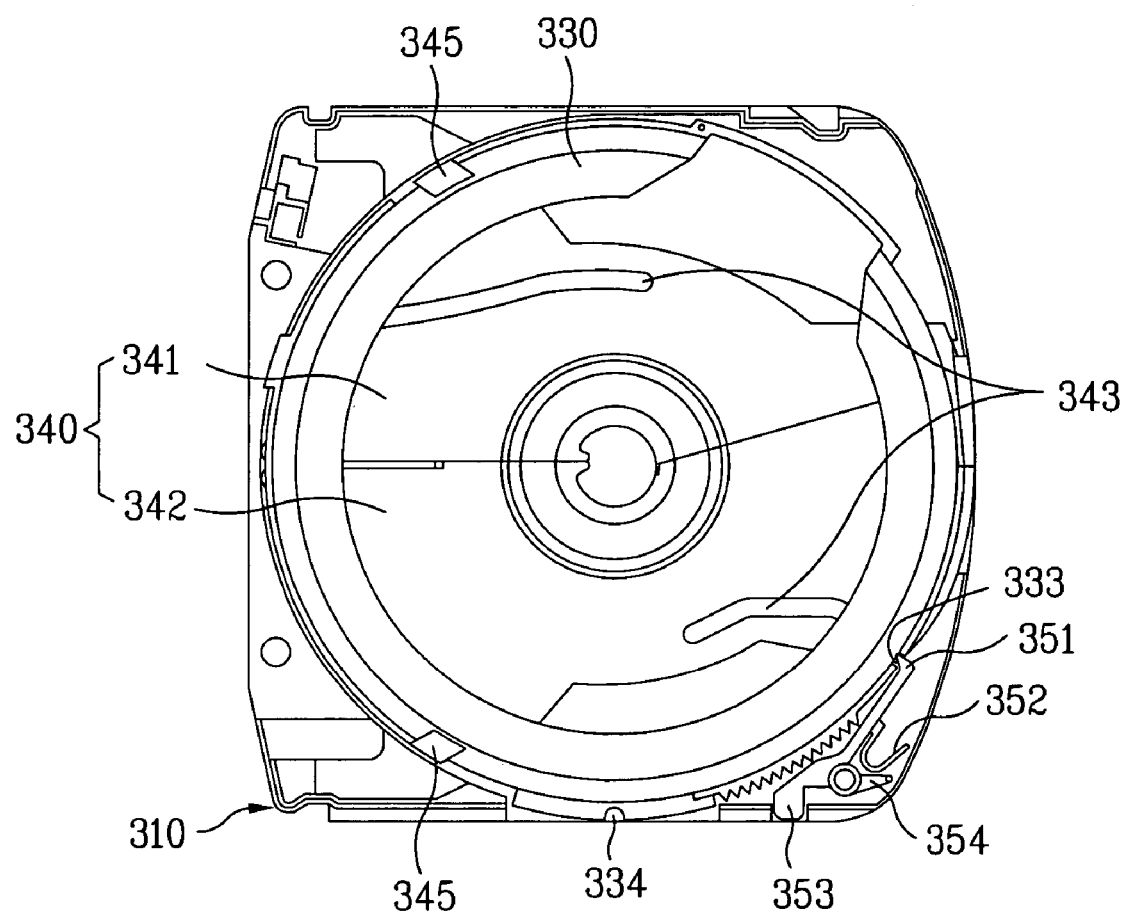
FIGS. 21A and 21C are layouts of a process of opening a window for record/playback of a disc.
Figure 21B:
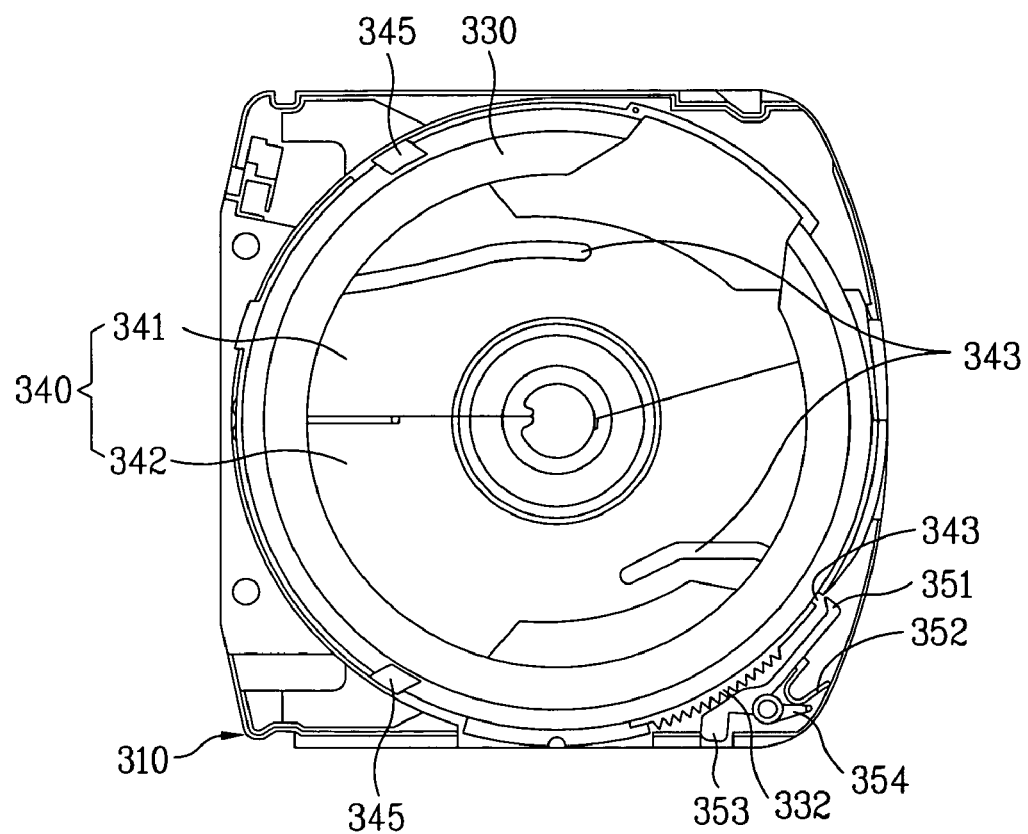
Figure 21C:
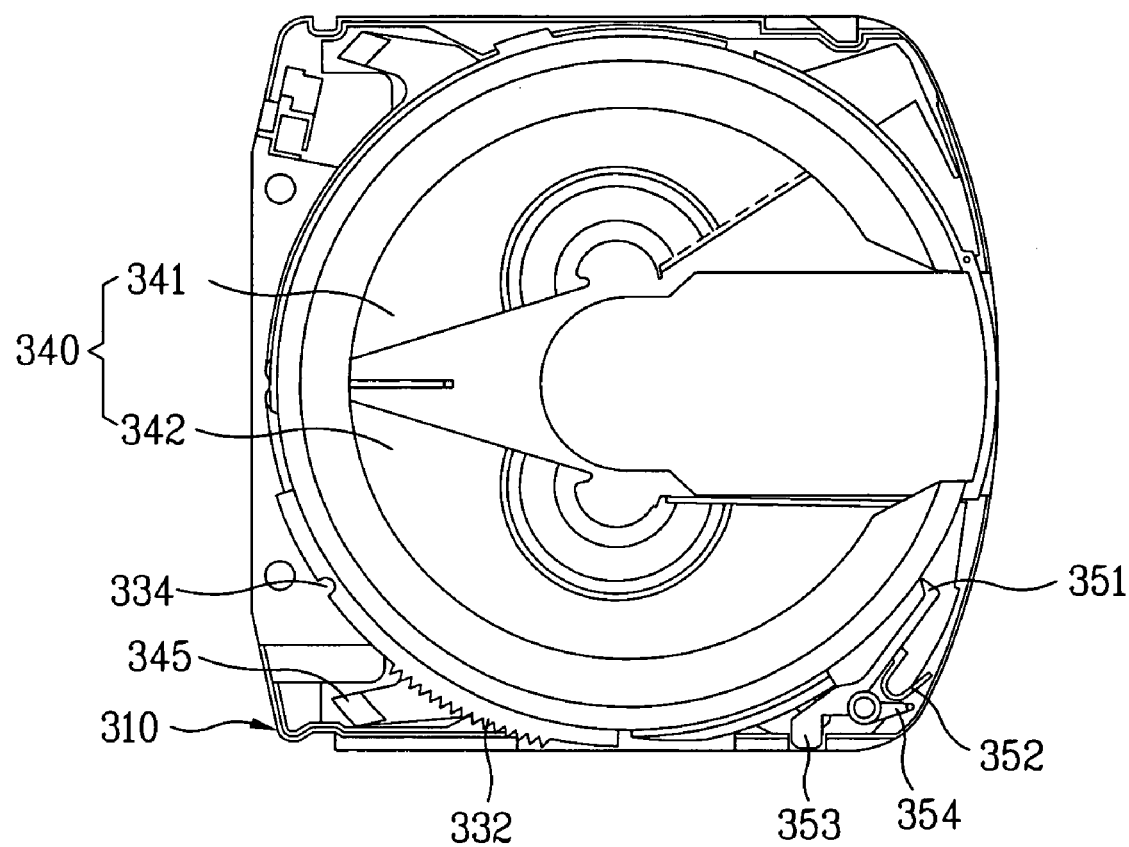

And, FIGS. 21A and 21C are layouts of a process of opening a window for record/playback of a disc.

Referring to FIG. 19A and FIG. 19B, a disc cartridge according to a further embodiment of the present invention further includes a movable case 360.

The moveable case 360 is provided movable to slide on one side of an upper case 320. Namely, in case of being moved in a direction getting farther from a center of the disc D, the movable case 360 interoperates with a locking lever 350 and rotating ring 330 to release a locking state of the locking lever 350 and simultaneously to rotate the rotating ring 330. In doing so, left and right shutters 341 and 342 interoperating with the rotating ring 300 become open.

For this, provided are a first link means for locking a rotation of the rotating ring 330 selectively by turning the locking lever 350 according to a movement of the movable case 360 and a second link means for opening/closing the left and right shutters 341 and 342 interoperating with the rotating ring 330 by rotating the rotating ring 330 according to the movement of the movable case 360.

The locking lever 350, which is turned centering on a rotational shaft 312 provided to one side of a lower case 310, includes a locking protrusion 351, an elastic piece 352, a handling protrusion 353, and a rotating protrusion 354.

The locking protrusion 351 is selectively fitted in a hanging recess 333 provided to an outer circumference of the rotating ring 330. And, the elastic piece 352 is provided to give a force of restitution toward the hanging recess 333 to the locking protrusion 351. In case of being pressed by an external force, the handling protrusion 353 makes the locking protrusion 351 escape from the hanging recess 333. And, the rotating protrusion 354 is moved along a first rotation guide 361 provided to the movable case 360.

Meanwhile, the first link means includes the rotating protrusion 354 provided to the locking lever 350 and the first rotation guide 361 provided the movable case 360 to receive the rotating protrusion 354 therein. Hence, as the movable case 360 is slid to move, a rim of the first rotation guide 361 pushes the rotating protrusion 354 to turn the locking lever 350.

The first rotation guide 361 includes a landing recess 361a and an extension slot 361b. The rotating protrusion 354 is inserted in the landing recess 361 while the movable case 360 is closed, whereby the locking lever 350 maintains a state of locking the rotating ring 330. On the other hand, the extension slot 361b communicates with the landing recess 361a. As the movable case 360 is moved, a rim of the extension slot 361b pushes the rotating protrusion 354 to turn the locking lever 350. In doing so, the rotating ring 330 is released from the locking state.

Meanwhile, the second link means, as shown in FIG. 20A, includes an opening/closing protrusion 330a and a second rotation guide 362. The opening/closing protrusion 330a is provided to the rotating ring 330 and the second rotation guide 362 is provided to the movable case 360 to hold the opening/closing protrusion 330a therein. Hence, as the movable case 360 is moved, a rim of the second rotation guide 362 pushes the opening/closing protrusion 330a to rotate the rotating ring 330.

The second rotation guide 362 includes a rectangular opening protrusion 362a and a rectangular closing protrusion 362b leaving a prescribed distance from the opening protrusion 362a. When the movable case 360 is moved in a direction getting farther from the center of the disc D, a rim of the opening protrusion 362a pushes the opening/closing protrusion 330a to rotate the rotating ring 330 clockwise. In doing so, the left and right shutters 341 and 342 interoperating with the rotating ring 330 become open.

On the other hand, when the movable case 360 is moved in a direction getting closer to the center of the disc D, a rim of the closing protrusion 362b pushes the opening/closing protrusion 330a to rotate the rotating ring 330 counterclockwise. In doing so, the left and right shutters 341 and 342 interoperating with the rotating ring 330 become closed.

Meanwhile, holding protrusions 345 are provided to the left and right shutters 341 and 342 to prevent a fluctuation of the disc D, respectively. And, the disc cartridge further includes third and fourth link means. The third link means moves the left and right shutters 341 and 342 to open/close the window W according to the rotation of the rotating ring 330.

And, the fourth link means moves to interoperate with the holding shutters as the left and right shutters 341 and 342 are opened or closed. In this case, each of the holding protrusions 345 has a channel type cross-section to support a top and bottom of the edge of the disc D.

The third link means includes slots 343 provided to the left and right shutters 341 and 342, respectively and protrusions 331 provided to the rotating ring 330 to be inserted in the corresponding slots 343, respectively. Hence, as the rotating ring 330 is rotated, the protrusions 331 push rims of the slots 343 to move the left and right shutters 341 and 342, respectively, whereby the window W provided to the lower case 310 can be open or closed.

And, the fourth link means includes the holding protrusions 345 and guide rails 323 formed at a bottom of the upper cases 320 to guide motions of the holding protrusions 345, respectively. Hence, as the left and right shutters 341 and 342 are open/closed, the holding protrusions 345 are slid along the guide rails 323 to hold or release the edge of the disc D, respectively.

Moreover, stepped portions 341a and 342a are provided to confronting sides of the left and right shutters 341 and 342 coming contact with each other, respectively. The stepped portions 341a and 342a are overlapped with each other to enhance rigidity of a coupling between the confronting sides of the left and right shutters 341 and 342.

Meanwhile, further provided to the outer circumference of the rotating ring 330 is a rotational interoperation means for opening the window W via the rotation of the rotating ring 330 and the movements of the left and right shutters 341 and 342 by the interoperation with the drive for record/playback of the disc D.

The rotational interoperation means includes the hanging recess 333, the gear part 332, and a moving recess 334. The hanging recess 333 is provided to the outer circumference of the rotating ring 330, and the locking protrusion 351 of the locking lever 350, which selectively locks the rotation of the rotating ring 330, is inserted in the hanging recess 333. The gear part 332 is provided to one side of the hanging recess 333 and the moving recess 334 is provided to the other side of the gear part 332.

Meanwhile, a separation-preventing member 370 is provided to an opposite side to the movable case 360. An inside end of the separation-preventing member 370 lies within a domain of the disc D to prevent a separation of the disc D. Coupling protrusion 370a are provided to a topside of the separation-preventing member 370 and coupling recesses 320b are provided to a bottom of the upper case to correspond to the coupling protrusions 320b. Preferably, the coupling protrusions 370a are fixed to the coupling recesses 320b by snap fitting, respectively.

Meanwhile, Guide protrusions are provided to either the movable case 360 or the upper case 320 and guide grooves 320c are provided to either the upper case 320 or the movable case 360. The guide protrusions are fitted in the guide grooves 320c so that a sliding movement of the movable case 360 can be guided.

In case that the movable case 360 is moved to an outside end of the upper case 320, the first and second rotation guides 362 fitted in the guide grooves 320 prevent the movable case 360 from being detached from the upper case 320.

And, a locking means for fixing the movable case 360 having been slid into a central part of the upper case 320 thereto is provided. The locking means includes fitting protrusions 320d provided to either the movable case 360 or the upper case 320 and fitting recesses 360a provided to either the upper case 320 or the movable case 360. The fitting protrusions 320d are fitted into the fitting recesses 360a by snap fitting, respectively.

Moreover, slip-preventing protrusions 360b are provided to a topside of the movable case 360 to facilitate to slide the movable case 360. An inside end of the movable case 360 lies within a disc domain of the rotating ring 330 to prevent the separation of the disc D.

A process of separating a disc from the disc cartridge is explained with reference to FIGS. 20A to 20C as follows.

First of all, the separating process is divided into a first open state and a second open state.

In the first open state, the locking of the locking lever 350 is released in the course of sliding to move the movable case 360 from the upper case 320 in a direction getting farther from the center of the disc D. Subsequently, in the second open state, the rotating ring 330 is rotated to move the left and right shutters 341 and 342 in the course of keeping moving the movable case 360 so that the holding state of the disc D is released.

The first and second open states are explained in detail as follows.

Referring to FIG. 20A, in a state that the movable case 360 is closed to the upper case 320, the rotating protrusion 354 of the locking lever 350 is inserted in the landing recess 361a of the first rotation guide 361 and the locking protrusion 351 of the locking lever 350 is inserted in the hanging recess 333 of the rotating ring 330 to restrict the rotation of the rotating ring 330.

Referring to FIG. 20B, once the movable case 360 is slid to move in the direction getting farther from the center of the disc D, the rotating protrusion 354 of the locking lever 350 is moved along an inside of the slot 361b of the first rotation guide 361 to turn the locking lever 350.

In doing so, the locking protrusion 351 is separated from the hanging recess 333 of the rotating ring 330 to release the locking of the rotating ring 330. Thus, the first open state is achieved.

Subsequently, if the movable case 360 keeps being slid to move, the opening/closing protrusion 330a provided to the rotating ring 330 is pushed to move by the rim of the opening protrusion 362a of the second rotation guide 362.

Referring to 20C, as the opening/closing protrusion 330a is moved, the rotating ring 330 is rotated clockwise and the left and right shutters 341 and 342 interoperating with the rotating ring 330 are moved. In doing so, the holding protrusions 345 provided to the left and right shutters 341 and 342 release the holding state of the disc D. Thus, the second open state is achieved. Hence, the disc D can be unloaded from the disc cartridge via the exposure window 320a of the upper case 320. Meanwhile, a process of loading the disc D in the disc cartridge is performed in a reverse manner of the above-explained separating process.

A process of opening/closing the window of the disc cartridge having the disc loaded therein according to the present invention is explained with reference to FIGS. 21A to 21C as follows.

As shown in the drawings, the hanging recess 333, gear part 332, and moving recess 334 are provided to the outer circumference of the rotating ring 330 and an opening member (not shown in the drawing) is provided within a disc drive. In this case, the rotating ring of the disc cartridge interoperates with the opening member (not shown n the drawing). Hence, information of the disc D is reproduced after the window W of the disc cartridge has been fully open.

Specifically, once the disc cartridge, as shown in FIG. 21A, is inserted in the disc drive, the opening member of the disc drive, as shown in FIG. 21B, presses the handling protrusion 353 of the locking lever 350. In doing so, the locking protrusion 351 is separated from the hanging recess 333 provided to the rotating ring 330.

Subsequently, if the disc cartridge keeps being inserted, the opening member interoperates with the moving recess 334 and gear part 332 provided to the outer circumference of the rotating ring 330 to rotate the rotating ring 330. In doing so, the moving recess 334 is coupled to a moving recess drive unit (not shown in the drawing) of the disc drive to generate an initial torque of the rotating ring 330.

Referring to FIG. 21C, once the rotating ring 330 is rotated, the protrusions 331 provided to the rotating ring 330 interoperate with the slots 343 provided to the left and right shutters 341 and 342, respectively. In doing so, the left and right shutters 341 and 342 are moved to open the window W provided to the lower case 310 via the space occurring between the shutters. The recorded information of the disc D can be reproduced by the disc drive via the window W.

Accordingly, the disc cartridge assembly according to the present invention provides the following advantages or effects.

First of all, the disc cartridge of the present invention is applicable to the portable record player enabling to receive a single disc entity only as well as the portable record player enabling to receive a disc-loaded cartridge, thereby preventing the damage of the disc.

Secondly, the disc separating apparatus according to the present invention facilitates to load/unload a disc in/from the disc cartridge. And, the disc cartridge safely kept within the disc separating apparatus can be prevented from being lost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A disc cartridge assembly comprising:
a lower case having a window for a drive access; an upper case provided onto the lower case, the upper case having an exposure window provided to a central part to expose a label face of a disc;
a rotating ring rotatably provided within the upper and lower cases to receive an outer circumference of the disc;
at least one shutter provided within the upper and lower cases to open/close the window by interoperating with a rotation of the rotating ring;
a rotating means for rotating the rotating ring by interoperating with an external device;
a holding protrusion provided to the shutter; and
a link means making the holding protrusion interoperate with a movement of the shutter to hold an edge of the disc selectively, wherein the link means comprises a guide rail provided to a bottom surface of the upper case to guide a movement of the holding protrusion and wherein the holding protrusion slid along the guide rail according to a rotation of the shutter holds or releases the edge of the disc.

2. The disc cartridge assembly of claim 1, further comprising a first link means for making the at least one shutter interoperate with the rotation of the rotating ring.

3. The disc cartridge assembly of claim 2, the first link means comprising: at least one slot provided to the at least one shutter; and at least one protrusion provided to a bottom surface of the rotating ring to be inserted in the at least one slot, wherein the at least one protrusion pushes a rim of the at least one slot to move the at least one shutter according to the rotation of the rotating ring.

4. The disc cartridge assembly of claim 1, wherein the holding protrusion has a channel type cross-section to support a top and bottom of the edge of the disc.

5. The disc cartridge assembly of claim 1, wherein the at least one shutter comprises first and second shutter parts coupled to rotation shafts provided to the lower case to open/close the window via a gap appearing when the first and second shutter parts are rotated centering on the rotation shafts, respectively.

6. The disc cartridge assembly of claim 5, wherein stepped portions are provided to the first and second shutter parts so that contact portions of the first and second shutter parts can be overlapped with each other while the window is closed.

7. A disc cartridge assembly comprising:
a lower case having a window for a drive access;
an upper case provided onto the lower case, the upper case having an exposure window provided to a central part to expose a label face of a disc;
a rotating ring rotatably provided within the upper and lower cases to receive an outer circumference of the disc;
at least one shutter provided within the upper and lower cases to open/close the window by interoperating with a rotation of the rotating ring; and
a rotating means for rotating the rotating ring by interoperating with an external device, the rotating means comprising: a gear part provided to one side of an outer circumference of the rotating ring to be externally exposed between the upper and lower cases; a hanging recess provided to one side of the gear part; and a locking means for locking the rotation of the rotating ring selectively by being coupled to the hanging recess of the rotating ring.

8. The disc cartridge assembly of claim 7, the locking means comprising: a locking protrusion interfering with the outer circumference of the rotating ring; an elastic piece providing the locking protrusion with a restitution force in an interfering direction of the locking protrusion with the rotating ring; and a locking lever having a handling protrusion protruding to be externally exposed to be turned centering on a rotational shaft provided to either the upper case or the lower case.

9. A disc cartridge assembly comprising:
a lower case having a window for a drive access;
an upper case provided onto the lower case, the upper case having an exposure window provided to a central part to expose a label face of a disc;
a rotating ring rotatably provided within the upper and lower cases to receive an outer circumference of the disc;
at least one shutter provided within the upper and lower cases to open/close the window by interoperating with a rotation of the rotating ring; and
a rotating means for rotating the rotating ring by interoperating with an external device, the upper case comprising: a left upper case; a right upper case separated from the left case to confront; a first separation-preventing member provided to one side between the left and right upper cases to selectively open the exposure window to load/unload the disc; and a second separation-preventing member provided to the other side between the left and right upper cases, the second separation-preventing member lying within a domain of the rotating ring to prevent a separation of the disc.

10. The disc cartridge assembly of claim 9 wherein the first separation-preventing member is selectively slid along the upper case.

11. The disc cartridge assembly of claim 9, wherein the first separation-preventing member is hinge-coupled to the upper case to be selectively turned upward or downward.

12. The disc cartridge assembly of claim 9, wherein a topside of the second separation-preventing member is gradually tilted downward in an external direction.

13. The disc cartridge assembly of claim 9, wherein a protrusion is provided to either the first separation-preventing member or the left/right upper case, wherein an insertion recess is provided to either the left/right upper case or the first separation-preventing member to confront the protrusion, and wherein the protrusion is fitted in the insertion recess by snap fitting.

14. A disc cartridge assembly comprising:
a lower case having a window for a drive access;
an upper case provided onto the lower case, the upper case having an exposure window provided to a central part to expose a label face of a disc;
a rotating ring rotatably provided within the upper and lower cases to receive an outer circumference of the disc;
at least one shutter provided within the upper and lower cases to open/close the window by interoperating with a rotation of the rotating ring;
a rotating means for rotating the rotating ring by interoperating with an external device; and
a disc separating apparatus for separating the disc by interoperating with the rotating means.

15. The disc cartridge assembly of claim 14, the disc separating apparatus comprising: an entrance provide to a front side to receive a disc cartridge; an opening provided to a topside to load/unload the disc; and a link device provided to one inside to rotate the rotating ring by interoperating with the rotating means of the disc cartridge.

16. The disc cartridge assembly of claim 15, the link device comprising: a locking release protrusion releasing a locking of the rotation of the rotating ring on insertion of the disc cartridge; an opening gear rotating the rotating ring while the locking of the rotation of the rotating ring is released; and a hanging protrusion preventing a free rotation of the rotating ring while the disc cartridge is loaded.

17. The disc cartridge assembly of claim 16, wherein the hanging protrusion is provided with a restitution force in an interfering direction.

18. The disc cartridge assembly of claim 16, wherein the locking release protrusion is coupled to an elastic member to be provided to an insertion recess provided to one side of the disc separating apparatus so that a portion of the locking release protrusion is elastically moved via the insertion recess.

19. The disc cartridge assembly of claim 15, further comprising: a first separation preventing member slid along one side of the upper case to selectively open the opening; and an interference protrusion provided to the entrance of the disc separating apparatus to open the opening by being contacted with the first separation-preventing member.

20. The disc cartridge assembly of claim 15, wherein a cover opening/closing the opening is provided to a topside of the disc separating apparatus.

* * * * *

UNITED STATES PATENT AND TRADEMARK OFFICE
CERTIFICATE OF CORRECTION

PATENT NO. : 7,536,703 B2  Page 1 of 1
APPLICATION NO. : 10/974790
DATED : May 19, 2009
INVENTOR(S) : Kyung Chan Park et al.

It is certified that error appears in the above-identified patent and that said Letters Patent is hereby corrected as shown below:

On title page please add:

Foreign Patent Documents

| | | |
|---|---|---|
| CN | 1239572 A | 12/1999 |
| EP | 0602731 A2 | 6/1994 |
| EP | 0772196 A2 | 7/1997 |
| EP | 0 929 070 A2 | 7/1999 |
| JP | 10-144039 | 5/1998 |
| JP | 10-269742 | 10/1998 |
| JP | 2000-113630 A | 4/2000 |
| JP | 2001-189068 | 10/2001 |
| JP | 2001-332058 A | 11/2001 |
| JP | 2002-025215 | 1/2002 |
| JP | 2003-115182 A | 4/2003 |
| WO | 03/041076 A1 | 5/2003 |

Signed and Sealed this

Seventeenth Day of November, 2009

David J. Kappos
*Director of the United States Patent and Trademark Office*